United States Patent
Ishijima et al.

(10) Patent No.: US 6,168,528 B1
(45) Date of Patent: Jan. 2, 2001

(54) TRIPOD TYPE CONSTANT VELOCITY JOINT

(75) Inventors: Minoru Ishijima, Isezaki; Toshihiro Ikeda, Takasaki; Yasumasa Mizukoshi, Fujisawa, all of (JP)

(73) Assignee: NSK Ltd., Tokyo (JP)

( * ) Notice: Under 35 U.S.C. 154(b), the term of this patent shall be extended for 0 days.

(21) Appl. No.: 09/058,804

(22) Filed: Apr. 13, 1998

(30) Foreign Application Priority Data

Jun. 27, 1997 (JP) .................................................. 9-186018

(51) Int. Cl.$^7$ ....................................................... F16D 3/26
(52) U.S. Cl. ............................................ 464/111; 464/905
(58) Field of Search ..................................... 464/111, 123, 464/124, 127, 132, 905

(56) References Cited

U.S. PATENT DOCUMENTS

| | | | |
|---|---|---|---|
| 5,069,653 | * 12/1991 | Mizukoshi | 464/111 |
| 5,203,741 | * 4/1993 | Turner et al. | 464/111 |
| 5,411,440 | * 5/1995 | Bensinger et al. | 464/111 |

FOREIGN PATENT DOCUMENTS

| | | | |
|---|---|---|---|
| 57-13210 | 3/1982 | (JP) . | |
| 3-1528 | 1/1991 | (JP) . | |
| 3-1529 | 1/1991 | (JP) . | |
| 5-67821 | 9/1993 | (JP) . | |
| 5-288225 | * 11/1993 | (JP) | ..................................... 464/111 |
| 7-15289 | 2/1995 | (JP) . | |
| 7-113379 | 12/1995 | (JP) . | |
| WO97/25545 | 7/1997 | (WO) . | |

\* cited by examiner

*Primary Examiner*—Lynne H. Browne
*Assistant Examiner*—Greg Binda
(74) *Attorney, Agent, or Firm*—Vorys, Sater, Seymour and Pease LLP

(57) ABSTRACT

In a tripod type constant velocity joint, out of the pair of guide surfaces, the guide surface on the anchor side to tightly press the outer peripheral face of the outer roller when the rotational torque is transmitted in a predetermined direction is made non-parallel to the central axis of the trunnion under a zero joint angle condition, and there are provided guide portions each having a contact surface to contact with a side face of the outer roller at the anchor side on the side on which a distance between the guide surface on the anchor side and the central axis of the trunnion is extended.

22 Claims, 19 Drawing Sheets

US 6,168,528 B1

TRIPOD TYPE CONSTANT VELOCITY JOINT

This application claims the benefits of Japanese Application Nos. 9-12712 and 9-186018 filed Jun. 27, 1997, which are hereby incorporated by reference.

BACKGROUND OF THE INVENTION

1. Field of the Invention

The present invention is related to a tripod type constant velocity joint which is disposed between rotating shafts connected with each other at a joint angle inside a drive system of, for example, an automobile, for transmitting a rotational torque at a constant velocity.

2. Related Background Art

Tripod type constant velocity joints have been widely used in the past as one type of constant velocity joints to be incorporated into automobile drive systems. For example, Japanese Patent Laid-Open Nos. 63-186036 (Patent Publication No. 3-1529) and 62-233522 (Patent Publication No. 3-1528) disclose a tripod type constant velocity joint 1, as shown in FIGS. 8 and 9. This constant velocity joint 1 is provided with a hollow cylindrical housing 3 which is secured to an end of a first rotating shaft 2 serving as a drive shaft or the like on the differential gear side, and a tripod 5 which is secured to an end of a second rotating shaft 4 serving as a driven shaft or the like on the wheel side.

Recesses 6 are formed at three locations on the internal face of the housing 3 at even spacing (a spacing of 120 degrees) in the circumferential direction. The tripod 5 secured to the second rotating shaft 4 is comprised of a boss 7 in which an end of the second rotating shaft 4 is fitted, and three trunnions 8 formed as cylindrical posts on the outer peripheral face of this boss 7 in the circumferential direction at even spacing (a spacing of 120 degrees). Around each of the trunnions 8, a roller 9 having an arcuate outer peripheral face is supported by means of a needle bearing 10 so as to be freely rotatable thereabout and slightly displaceable in the axial direction. Then, the constant velocity joint is constituted by fitting these rollers 9 in the recesses 6 on the housing side. A pair of inner side faces 11 for constituting each of the recesses 6 is respectively formed as arcuate concave faces, and the roller 9 is supported to be able to swing and slide freely between this pair of inner side faces 11.

With this constant velocity joint 1, when, for example, the first rotating shaft 2 is rotated, the rotational torque thereof is transmitted from the housing 3 to the boss 7 of the tripod 5 through the rollers 9, the needle bearings 10, and the trunnions 8, so as to rotate the second rotating shaft 4 which is secured to the boss 7 at one end thereof. Moreover, when the central axis of the first rotating shaft 2 and the central axis of the second rotating shaft 4 are out of alignment (or when there is a joint angle between the first rotating shaft 2 and the second rotating shaft 4), the respective trunnions 8 swing around the boss 7 of the tripod 8 relative to the inner side faces 11 of the corresponding recesses 6, accompanying rotation of these first and second rotating shafts 2 and 4, as shown in FIGS. 8 and 9. In this case, the rollers 9 supported by the respective trunnions 8 are rolled on the inner side faces of the recesses 6 and, at the same time, moved axially along the trunnions 8. Due to these movements, the constant velocity between the first and second rotating shafts 2 and 4 can be maintained, as well known in the art.

With the constant velocity joint 1, when the first and second rotating shafts 2 and 4 are rotated with the joint angle therebetween, the respective rollers 9 carry out a complicated movement. That is to say, in this condition, the rollers 9 are moved in the axial direction of the housing 3 along the corresponding inner side faces 11 while changing their orientation, and also move and slide axially along the trunnions 8. When the rollers 9 are subjected to such complicated movement, a relative movement between the outer peripheral face of each of the rollers 9 and the corresponding inner side face 11 is not always carried out smoothly, so that a relatively large frictional resistance may be produced between both the faces. In this case, in the constant velocity joint 1 shown in FIGS. 8 and 9, a relatively large three-dimensional axial force is generated for each rotation and, when a large torque is transmitted under large joint angle conditions in a drive system or the like of an automobile, a vibration known as shudder is generated.

A constant velocity joint 1a as shown in FIGS. 10 to 12 is disclosed in the above-mentioned Japanese Patent Laid-Open No. 63-186036, as a construction to suppress such vibrations arising from the above cause. In this improved type constant velocity joint 1a, a roller 9a supported on each of the trunnions 8 is composed of a set of an inner roller 12 and an outer roller 13. The inner roller 12 is formed to have a cylindrical inner peripheral face and a spherical convex outer peripheral face, and is supported on each of the trunnions 8 through a bearing 14. The outer roller 13 is formed with a cylindrical inner peripheral face and is fitted therein, so as to freely swing and move in the axial direction by the inner roller 12. Moreover, the outer peripheral faces of the outer rollers 13 are in rolling contact with guide surfaces 31 which are formed in pairs for the respective recesses 6 formed on the inner face of the housing 3 so as to be able to move only along the axial direction of the housing 3 (in the left and right direction in FIGS. 10 and 12, and the front and rear direction in FIG. 11).

In the constant velocity joint 1a, when the rollers 9a are moved along the axial direction of the housing 3, the outer rollers 13 for forming these rollers 9a are rolled. Also, when the rollers 9a swing or rock around the tripod 5 or move back and forth along the axial directions of the trunnions 8, the inner rollers 12 for forming the respective rollers 9a rock and slide relative to the corresponding outer rollers 13. This movement of the outer peripheral faces of the outer and inner rollers 13 and 12 relative to the mating faces is simpler and more stable than the movement of the rollers 9 relative to the inner side faces 11 and the trunnions 8 in the construction shown in FIGS. 8 and 9. Consequently, an axial force which is produced accompanying the rotation of the constant velocity joint 1a is reduced, so that even when a large torque is transmitted with a large joint angle, the occurrence of the shudder is reduced.

DESCRIPTION OF THE PRIOR INVENTION

Further, a construction as shown in FIGS. 13 to 16 is disclosed in the Japanese Patent Application Nos. 8-4073 and 8-138335 which are the basic patent applications of the International Application No. PCT/JP97/00017 filed by the present applicants (published under International Publication No. WO97/25545), as an improvement of the second example shown in FIGS. 10 to 12 to enhance the durability of the tripod type constant velocity joint. Also in the case of this prior invention, an end of a first rotating shaft which is not shown in the figure is fitted in and fixed to the central part of one end (on the back face side in FIG. 13) of a hollow cylindrical housing 3a which is open on the other end side in the axial direction, and an end of a second rotating shaft which is also not shown in the figure is fitted in and fixed to a tripod 5.

On the inner face of the housing 3a, recesses 6a are formed at three locations at even spacing in the circumferential direction. Moreover, a pair of guide recess grooves 15 are formed for each of the recesses 6a along the axial direction of the housing 3a (in the front and rear direction in FIG. 13 and in the right and left direction in FIGS. 15 and 16) at locations opposite to each other on the inner face of each of the recesses 6a. That is to say, parts opposite to each other on the inner face of each of the recesses 6a are caved, as compared to the both sides thereof, to become the pair of guide recess grooves 15. The pairs of guide recess grooves 15 in the respective recesses 6a have the bottom faces 16 which are made parallel to each other.

Three trunnions 8 are formed on the tripod 5 at even spacing (a spacing of 120 degrees) as projecting from the outer peripheral face of the cylindrical boss 7 to which an end of the second rotating shaft is fitted and fixed. The trunnions 8 respectively intrude into the recesses 6a of the housing 3a. It should be noted that a spline 17 is formed on the inner peripheral face of the boss 7, which allows transmission of a large rotating torque between the boss 7 and the second rotating shaft.

An inner roller 12a is supported on each of the trunnions 8 through a radial needle bearing 18 so as to freely rotate and freely move along the axial direction of the trunnion 8. The radial needle bearing 18 shown in the figure is a so-called full type roller bearing with no retainer. However, a needle bearing with a retainer can be used instead, depending on a load condition. Moreover, an annular retaining ring 19 is fitted on each of the trunnions 8 at a portion protruding from the radial needle bearing 18, and this retaining ring 19 is stopped by a stop ring 21 fitted in an engagement groove 20. As a result, the retaining rings 19 and the needles 22 which form the radial needle bearings 18 are not drawn out of the respective trunnions 8.

Moreover, a stop rim 23 is formed on the retaining ring 19 shown in the drawing, as protruding outwardly in the radial direction from the outer end edge portion (the end portion on the farthest side from the outer peripheral face of the boss 7) of the retaining ring 19. The outer diameter D23 of the stop rim 23 is larger than the inner diameter R12a of the inner roller 12a (D23>R12a). Consequently, though each inner roller 12a is capable of moving in the axial direction of the corresponding trunnion 8, an amount of displacement of the inner roller 12a is limited by the outer peripheral face of the boss 7 and the stop rim 23. The inner peripheral face of the inner roller 12a is formed as a cylindrical face 24 to be able to move along the axial direction of each of the trunnions. On the other hand, the outer peripheral face of the inner roller 12a is formed as a spherical convex surface 25.

An outer roller 13a is supported on each of the inner rollers 12a. The outer peripheral face of the outer roller 13a is formed as a rolling contact face in a cylindrical face shape so as to able to roll only along the axial direction of the housing 3a in contact relation with the guide recess groove 15. To this end, the outer diameter D13a of the outer roller 13a is set to be slightly smaller than the spacing D15 between the paired guide recess grooves 15 (between the bottom faces thereof) (D13a<D15), and the width W13a of the outer roller 13a is set to be slightly smaller than the width W15 of the guide recess groove 15 (W13a<W15).

Moreover, the inner peripheral surface of each of the outer rollers 13a is formed as a spherical concave face 26, and the spherical convex surface 25 of the inner roller 12a is fitted in this spherical convex surface 25 so that the outer roller 13a is able to swing or rock freely relative to the inner roller 12a. Insertion grooves 27 are formed at two positions which are opposite to each other on the inner peripheral face of the outer roller 13a, and the inner roller 12a is fitted in the outer roller 13a through these insertion grooves 27. It should be noted that these insertion grooves 27 are conventionally known as disclosed in the Japanese Utility Model Laid-Open No. 5-67821.

In the tripod type constant velocity joint according to the prior invention, when the inner rollers 12a and the outer rollers 13a are moved along the axial direction of the housing 3a, the outer rollers 13a are rolled relative to the guide recess grooves 15. Moreover, when the trunnions 8 swing and rock around the boss 7 of the tripod 5, the inner rollers 12a swing and rock relative to the outer rollers 13a. Also, when the inner rollers 12a and the outer rollers 13a are moved along the axial directions of the trunnions 8, the inner rollers 12a supported on the trunnions 8 through the radial needle bearings 18 are moved relative to the respective trunnions 8. In such a tripod type constant velocity joint of the prior invention, the constituent parts are contacted to each other in a sliding manner at a relatively large area, whereby friction and premature flaking (peeling) of the surfaces of these constituent parts can be suppressed.

In the case of the tripod type constant velocity joint of the prior invention, a frictional resistance caused by the sliding contact between the outer face of the outer roller 13a and the inner face of the guide recess groove 15 is not stable so that the efficiency in transmission is not always satisfactory. The reasons for this will be described below with reference to FIGS. 17 to 19.

As shown in FIGS. 8 and 9, when a rotational torque is transmitted with a joint angle provided between the first rotating shaft 2 and the second rotating shaft 4, the three trunnions 8 for forming the tripod 5 swing and rock back and force around the boss 7. On the other hand, the respective outer rollers 13a only move back and forth within a predetermined stroke along the guide recess grooves 15 in the axial direction of the housing 3a (in the left and right directions in FIG. 17). As a result, a force is applied to each of the outer rollers 13a in a direction perpendicular to the guide recess grooves 15. It should be noted that though the guide recess grooves 15a shown in FIGS. 17 to 19 have a similar shape to that in a second embodiment of the present invention which will be described later, the same arrangement is employed in the case of the guide recess grooves 15 having a shape shown in FIGS. 13 to 16. For example, when the trunnions 8 swing and move from a condition shown in FIG. 17A to a condition shown in FIG. 17B, a force in the pushing direction (the upward direction in FIGS. 17A and 17B) is applied to the outer rollers 13a, the outer side faces of the outer rollers 13a near the outer peripheries thereof (the face on the side farthest from the boss 7; the upper face in FIG. 17) are pressed against the inner side faces of the guide recess grooves 15a (15). On the other hand, when the trunnions 8 swing and move from the condition in FIG. 17B to the condition in FIG. 17A, a force in the pulling direction (the downward direction in FIGS. 17A and 17B) is applied to the outer rollers 13a, so that the outer side faces of the outer rollers 13 on the inner peripheries thereof (the face on the side of the boss 7; the lower face in FIGS. 17A and 17B) is pressed against the inner faces of the guide recess grooves 15a (15).

As described above, the width W13a of the outer roller 13a is set to be slightly smaller than the width W15 of the guide recess groove 15 (15a) (W13a<W15). The reason for this is to prevent the outer side face of the outer roller 13a from strongly rubbing against the inner side face of the guide groove 15 (15*a*). As a result, between the outer side face of the outer roller 13*a* and the inner side face of the guide groove 15 (15*a*), there is formed a gap 28 as shown in FIG. 18. Also, when the trunnions 8 swing around the boss 7, a force acts upon the outer roller 13*a* in a direction inclined relative to the guide groove 15*a* (15), owing to the friction between the spherical convex surface 25 and the spherical concave surface 26. Then, by means of this force and the gap 28, the outer roller 13*a* is inclined relative to the guide groove 15*a* (15), as shown in FIG. 19 in an exaggerated manner.

As described above, if the outer roller 13*a* is inclined relative to the guide groove 15*a* (15), when the trunnions 8 swing, the outer roller 13*a* tends to ride over the guide groove 15*a* and a large frictional force acts between the inner side face of the guide groove 15*a* (15) and the outer side face of the outer roller 13*a*. As a result, rolling of the outer roller 13*a* can not be carried out smoothly, frictional losses are increased inside the tripod joint 1*a*, and a transmission efficiency of the rotational torque is reduced. In addition, the axial force to be applied upon the trunnions 8 is increased. With such increase of the axial force, when use conditions are severe, e.g., when a large torque is transmitted with a large joint angle, the above-mentioned occurrence of shudder may not be prevented.

SUMMARY OF THE INVENTION

The present invention has been contrived in view of the above situation, and an object of the invention is to provide a tripod type constant velocity joint to enhance the transmission efficiency of a rotational torque and to avoid a shudder.

According to the present invention, in order to solve the above-mentioned problems, there is proposed a tripod type constant velocity joint which comprises a housing formed in a hollow cylindrical shape opened at one end thereof in the axial direction and secured to an end of a first rotating shaft, three recesses formed at equal spacing on the inner face of this housing in the circumferential direction, a pair of guide surfaces formed at positions opposite to each other in each of the recesses to extend along the axial direction of the housing, a tripod secured to an end of a second rotating shaft and having three trunnions protruding from the outer peripheral face thereof at equal spacing in the circumferential direction to be inserted into the respective recesses, three inner rollers fitted on the trunnions to be freely rotated, and three outer rollers fitted on these inner rollers to freely swing and having the outer peripheral faces respectively serving as rolling contact surfaces placed in rolling contact relationship with the guide surfaces, wherein each of these outer rollers is moved along the axial direction of the corresponding trunnion so that a rotational torque can be transmitted at constant velocity between the both rotating shafts even with a joint angle provided between the first and second rotating shafts, which constant velocity joint is characterized in that, out of the pair of guide surfaces, the guide surface on the anchor side to tightly press the outer peripheral face of the outer roller when the rotational torque is transmitted in a predetermined direction is made non-parallel to the central axis of the trunnions under a zero joint angle condition and, preferably, in that there are provided guide portions each having a contact surface to contact with a side face of the outer roller at the anchor side on the side on which a distance between the guide surface on the anchor side and the central axis of the trunnion is extended.

In a tripod type constant velocity joint of the present invention, since the guide surfaces on the anchor side and the central shafts of the respective trunnions are non-parallel to each other, when the rotational torque is transmitted, a component force of the rotational torque acts on the outer rollers in a direction on which a distance between the anchor-side guide surface and the central axis of the trunnion is expanded. As a result, frictional losses inside the tripod type constant velocity joint are reduced to enhance the transmission efficiency of the rotational torque, the axial force acting on the tripod is also reduced, whereby occurrence of the shudder becomes reduced. Consequently, the side faces of the outer rollers are pressed against the contact surfaces of the guide portions, so that fluctuation in the rolling direction thereof is suppressed to be stabilized. As a result, it becomes easier for the outer rollers to smoothly roll along the anchor-side guide surfaces.

DESCRIPTION OF THE PREFERRED EMBODIMENTS

Preferred embodiments of the present invention will be hereinafter described. It should be noted that a characteristic of a preferred form of the present invention lies in a structure for reducing frictional losses inside a tripod type constant velocity joint and preventing occurrence of a vibration called the shudder at the same time, at the time of transmission of a rotational torque under a joint angle condition. Certain structures and effects of the embodiments of the present invention are substantially the same as or equivalent to those of the prior invention shown in FIGS. 13 to 16, so that illustration and description on the parts or members of the embodiments which are the same as those shown and described with respect to said prior invention will be omitted or abbreviated, with the following description focusing on the characteristic parts of the embodiments.

Moreover, three pairs of guide surfaces and rollers, etc., are identical to each other, so that only one pair is given the referential numerals for avoiding complexity.

Figure 1:
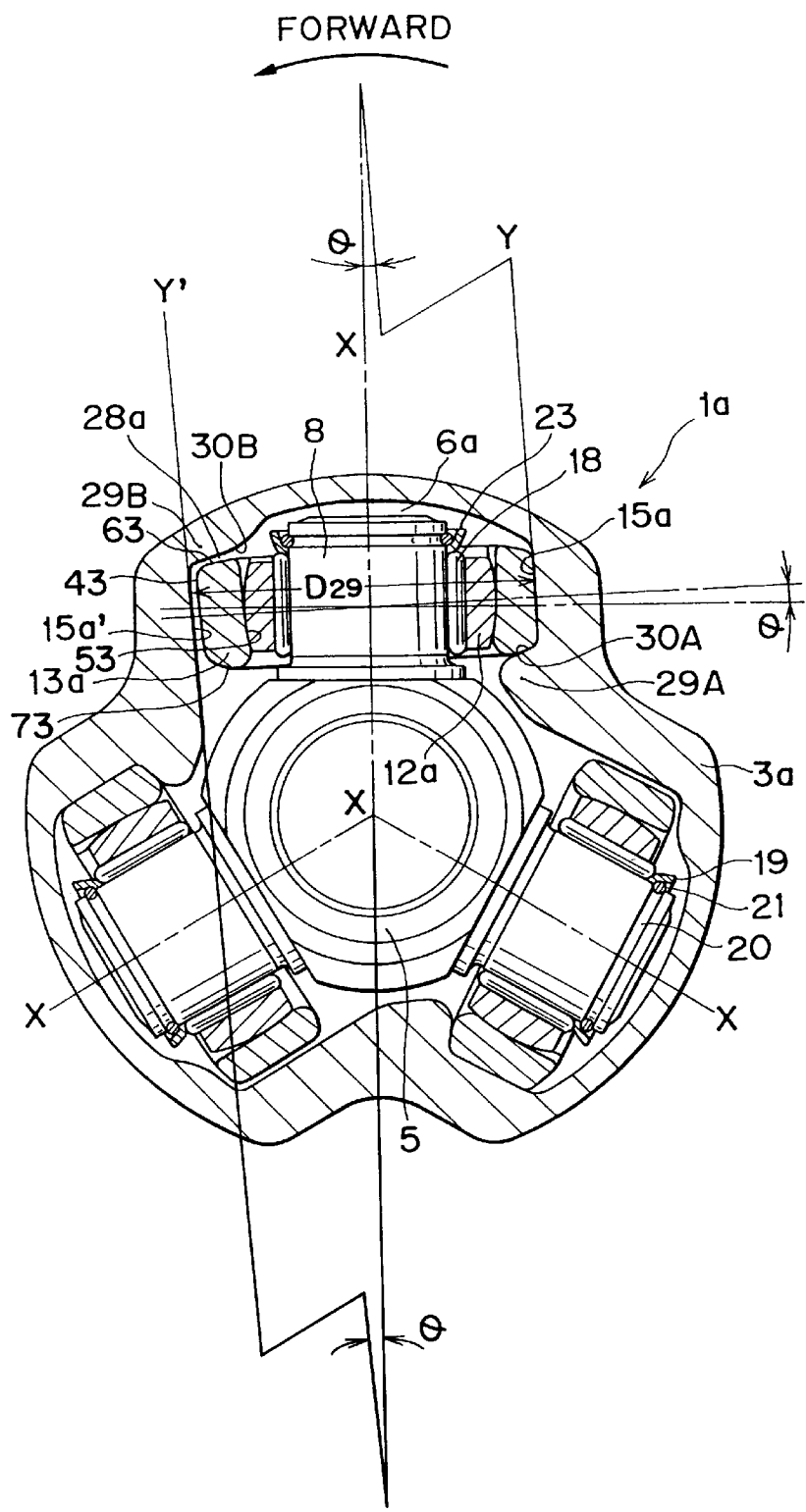
FIG. 1 is a longitudinal cross sectional view showing the first embodiment of the present invention.

FIG. 1 shows the first embodiment of the present invention, seen in a longitudinal cross section.

When the structure according to the first embodiment shown in FIG. 1 is compared with the structure according to the prior invention shown in FIGS. 13 to 16, the outer shape of a housing 3a is different. However, this difference in the outer shape of the housing 3a has no relation to the gist of the present invention.

The housing 3a is a hollow cylindrical body which is open at an end in the axial direction. An end of a first rotating shaft which is not shown in the figure is fitted in and fixed to the central part of one end (on the back face side in FIG. 1) of the hollow cylindrical housing 3a, and an end of a second rotating shaft which is also not shown in the figure is fitted in and fixed to a tripod 5.

If an automobile which incorporates the structure of this embodiment in the drive system thereof is started forward, the housing 3a and the tripod 5 are rotated in a counter clockwise direction in FIG. 1. Consequently, out of engagement portions between guide surfaces 15a, 15a' and outer rollers 13a which will be described later, the guide surfaces 15a and portions of the outer faces 43 of the outer rollers 13a on the leading side in the clockwise direction are at an anchor side to contact with each other to transmit the rotational torque. On the other hand, the guide surfaces 15a' and opposite portions of the outer peripheral faces 43 of the outer rollers 13a are at a counter anchor side to be separated from each other.

Recesses 6a are formed on three locations at equal spacing on the inner face of the housing 3a in the circumferential direction, and a pair of flat and parallel guide surfaces 15a, 15a' are provided in each of the recesses 6a to be opposite to each other. A guide portion 29A having an inclined contacting surface 30A is formed on the inner side of each of the guide surfaces 15a in the radial direction, while on the outer side of each of the guide surfaces 15a' in the radial direction, there is formed a guide portion 29B having an inclined contacting surface 30B. The inner side of the guide surface 15a' in the radial direction is formed to extend straight. That is to say, the guide surfaces 15a, 15a' have asymmetric shapes, and an angle between each of the contacting surfaces 30A, 30B and the guide surface is set to be an obtuse angle. Such asymmetric shapes of the guide surfaces facilitate drawing of a forging material for forming the housing 3a.

Three trunnions 8 provided at even spacing on the tripod 5 are inserted into the respective recesses 6a.

On each of the trunnions 8 an inner roller 12a is supported through a radial needle bearing 18 so as to freely rotate and freely move along the axial direction of the trunnion 8. The radial needle bearing 18 shown in the figure is a so-called full type roller bearing with no retainer. However, a needle bearing with a retainer can be used instead, depending on a load condition. Moreover, an annular retaining ring 19 is fitted on each of the trunnions 8 at a portion protruding from the radial needle bearing 18, and this retaining ring 19 is stopped by a stop ring 21 fitted in an engagement groove 20. As a result, the retaining rings 19 and the needles 22 which form the radial needle bearings 18 are not drawn out of the respective trunnions 8.

Moreover, a stop rim 23 is formed on the retaining ring 19 shown in the drawing, as protruding outwardly in the radial direction from the outer end edge portion (the end portion on the farthest side from the outer peripheral face of the boss 7) of the retaining ring 19. The outer diameter D23 of the stop rim 23 is larger than the inner diameter R12a of the inner roller 12a (D23>R12a). Consequently, though the inner roller 12a is capable of moving in the axial direction of each of the trunnions 8, an amount of displacement of the inner roller 12a is limited by the outer peripheral face of the boss 7 and the stop rim 23. The inner peripheral face of the inner roller 12a is formed as a cylindrical face to be able to move along the axial direction of each of the trunnions. On the other hand, the outer peripheral face of the inner roller 12a is formed as a spherical convex surface.

An outer roller 13a is supported on each of the inner rollers 12a. The outer peripheral face 43 of the outer roller 13a is formed as a rolling contact face in a cylindrical face shape so as to able to roll only along the axial direction of the housing 3a in contact relation with the guide recess grooves 15a, 15a'.

The inner peripheral surface 53 of each of the outer rollers 13a is formed as a spherical concave face, and the spherical convex surface of the inner roller 12a is fitted in this spherical concave surface 53 so that the outer roller 13a is able to swing or rock freely relative to the inner roller 12a.

In the case of the tripod type constant velocity joint of the first embodiment, the recesses 6a and the outer rollers 13a are provided asymmetrically relative to the respective trunnions 8 in a state where the rotational torque is transmitted between the housing 3a and the tripod 5. If an automobile which incorporates the structure of the present embodiment in the drive system thereof is started forward, the housing 3a rotates the tripod 5 in the counter clockwise direction (forward rotation) in FIG. 1 and the guide surfaces 15a and the outer peripheral faces 43 of the outer rollers 13a existing on the trailing side in the rotating direction, which is the anchor side, are brought into contact with each other, while if the automobile is moved backward, the housing 3a rotates the tripod 5 in the clockwise direction (backward rotation) in FIG. 1 and the guide surfaces 15a' existing on the leading side in the forward rotating direction and the outer peripheral faces 43 of the outer rollers 13a, which is the anchor side, are brought into contact with each other.

In the case of the first embodiment, the shapes and dimensions of the constituent parts of the joint are limited so that each guide surface 15a and the outer peripheral face 43 of the corresponding outer roller 13a are brought into contact to each other, and at a joint angle of zero degrees the trunnions 8 and the respective guide surfaces 15a on the anchor side are opposite to each other in a mutually inclined manner, as stated above. That is to say, the guide surfaces 15a, 15a' (the extension lines of which are indicated by Y and Y') are set to be parallel to each other and to be inclined only by the angle θ relative to the central axis X of the corresponding trunnion 8. It is noted that the central axes X are inclined in the front and rear direction of FIG. 1 when a joint angle is provided between the housing 3a and the tripod 5. Consequently, when the guide surfaces 15a, 15a' and the central axis X of each of the trunnions 8 are disposed to be non-parallel to each other, the joint angle is set to zero degrees in which case the axial center of the first rotating shaft an end of which is fitted in and secured to the housing 3a is aligned with the axial center of the second rotating shaft 4 an end of which is fitted in and secured to the tripod 5.

In the tripod type constant velocity joint of the first embodiment, the guide surfaces 15a, 15a' to which the outer peripheral faces 43 of each outer roller 13a are contacted and the central axis X of the corresponding trunnion 8 are disposed non-parallel to each other at the joint angle of zero degrees, so that the inner side (inner end) faces 73 (or the outer side (outer end) faces 63) of the respective outer rollers 13a are kept pressed against the contacting surfaces 30A of the guide surfaces 15a (or the contacting surfaces 30B of the guide surfaces 15a') at the time of transmission of rotation. The reasons for this are as follows.

At the time of forward rotation, for example, out of the guide surfaces 15a, 15a', the guide surface 15a at the anchor side presses the outer peripheral face 43 of the corresponding outer roller 13a. In the case of the first embodiment, since the guide surface 15a and the central axis X of the corresponding trunnion 8 are disposed to be non-parallel to each other, a component force is produced in a direction to move the outer roller 13a inwardly in the axial direction. Then, owing to this component force, the outer roller 13a is moved inwardly in the axial direction of the trunnion 8 together with the inner roller 12a so as to be pressed against the contacting surface 30A formed inside the guide surface 15a in the radial direction.

More specifically, each of the outer rollers 13a is moved to the side on which a space between the guide surface 15a and the central axis X of the corresponding trunnion 8 is extended (hereinafter called the extension side). Accordingly, in the case of the first embodiment, the inner side surface 73 of each outer roller 13a is pressed against the corresponding contacting surface 30A in inner part of the constant velocity joint 1a in the radial direction. As a result, a direction in which each of the outer rollers 13a is to be rolled is not largely inclined relative to the length direction of the corresponding guide surface 15a (the front and rear direction of FIG. 1), so that the corresponding outer roller 13a can be rolled along the guide surface 15a smoothly. In this case, in the outer part of the constant velocity joint 1a in the radial direction, a gap 28a is always present between each of the outer rollers 13a and each of the contacting surfaces 30B. As a result, not only can the losses caused by friction produced inside the tripod type constant velocity joint be reduced and the transmission efficiency enhanced, but the occurrence of the shudder can be suppressed effectively.

It is noted that the guide surfaces 15a' which are present at the counter anchor side at the time of forward rotation are parallel to the guide surfaces 15a at the anchor side. The reason for this arrangement is to prevent the outer peripheral faces 43 of the respective outer rollers 13a from frictionally contacting the guide surfaces 15a' at the counter anchor side, in view of the fact that the central axes of the respective outer rollers 13a are inclined relative to the central axes of the respective trunnions 8 at the time of the power transmission. That is to say, the rotational resistance of the respective outer rollers 13a becomes large when the outer peripheral faces 43 of the respective outer rollers 13a are frictionally contacted to the guide surfaces 15a' at the counter anchor side, so that power losses inside the constant velocity joint 1a are increased and the axial force is enhanced. Then, the guide surfaces 15a' at the counter anchor side and the guide surfaces 15 at the anchor side are disposed to be parallel to the outer peripheral faces 43 of the outer rollers 13a, so as to prevent the power loss and axial force from increasing.

Further, in the case of the first embodiment, each of the outer rollers 13a is not fitted in the recess groove as shown in FIGS. 13 to 16, but is brought into contact only with the flat guide surface 15a and the contacting surface 30A, since the contacting surfaces 30A, 30B are provided only on one side with respect to the guide grooves 15, 15a of the housing 3a. As a result, the power loss due to the friction produced inside the joint is reduced and the transmission efficiency is enhanced.

Figure 13:
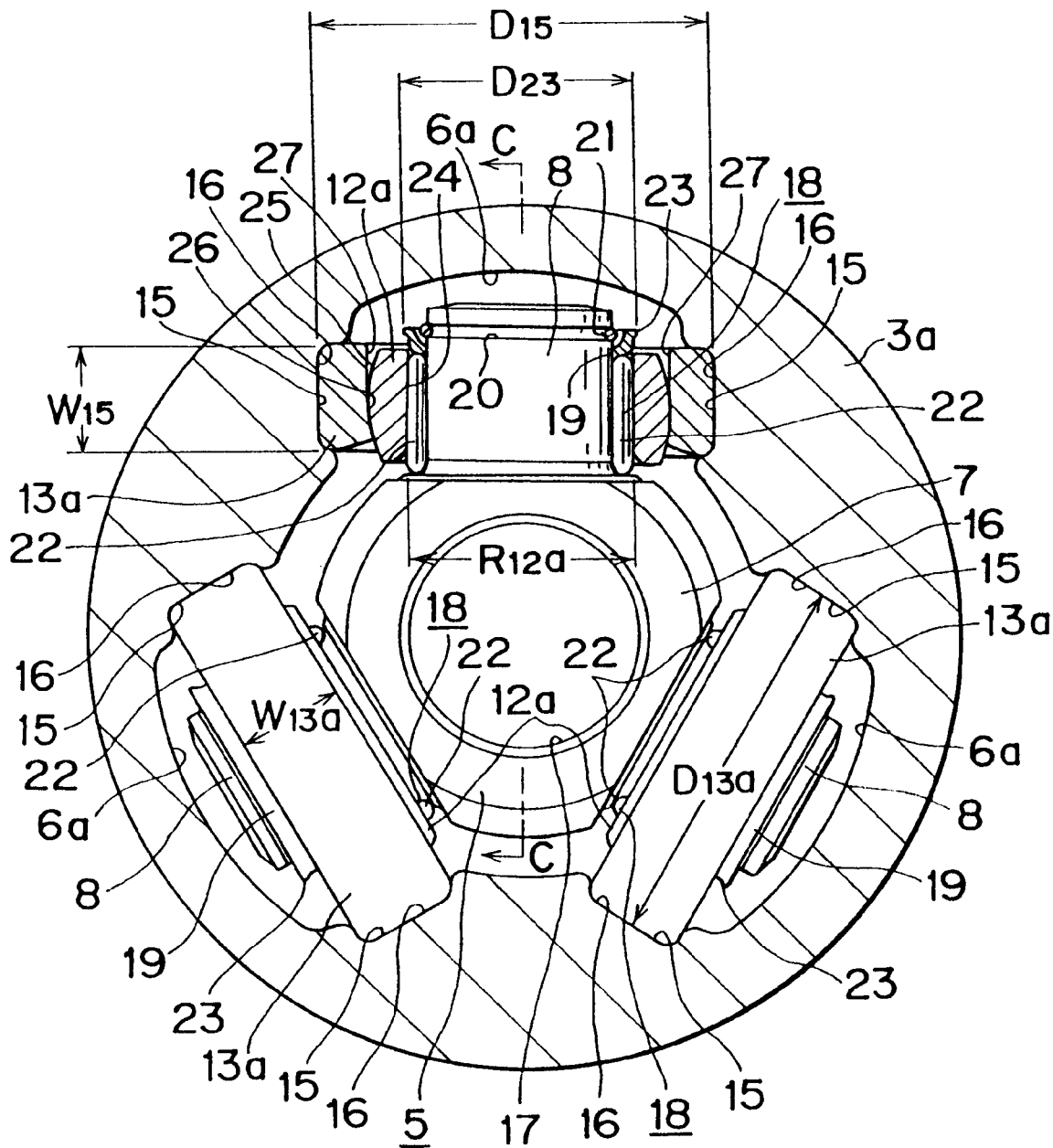
FIG. 13 is a partial cut-away front view showing a tripod type constant velocity joint according to the prior invention.
Figure 14:
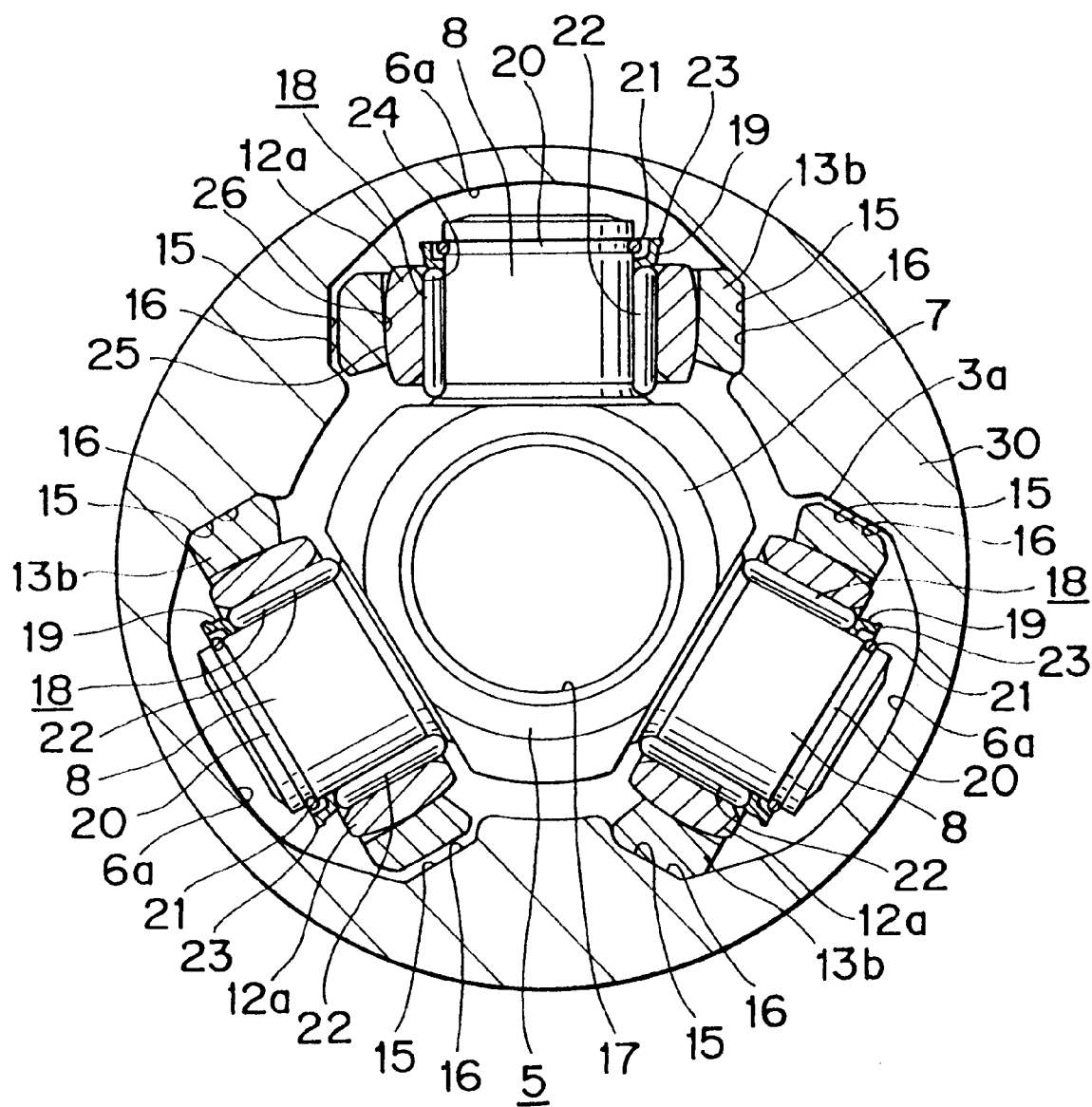
FIG. 14 is a partial cut-away front view showing the tripod type constant velocity joint according to the prior invention.
Figure 15:
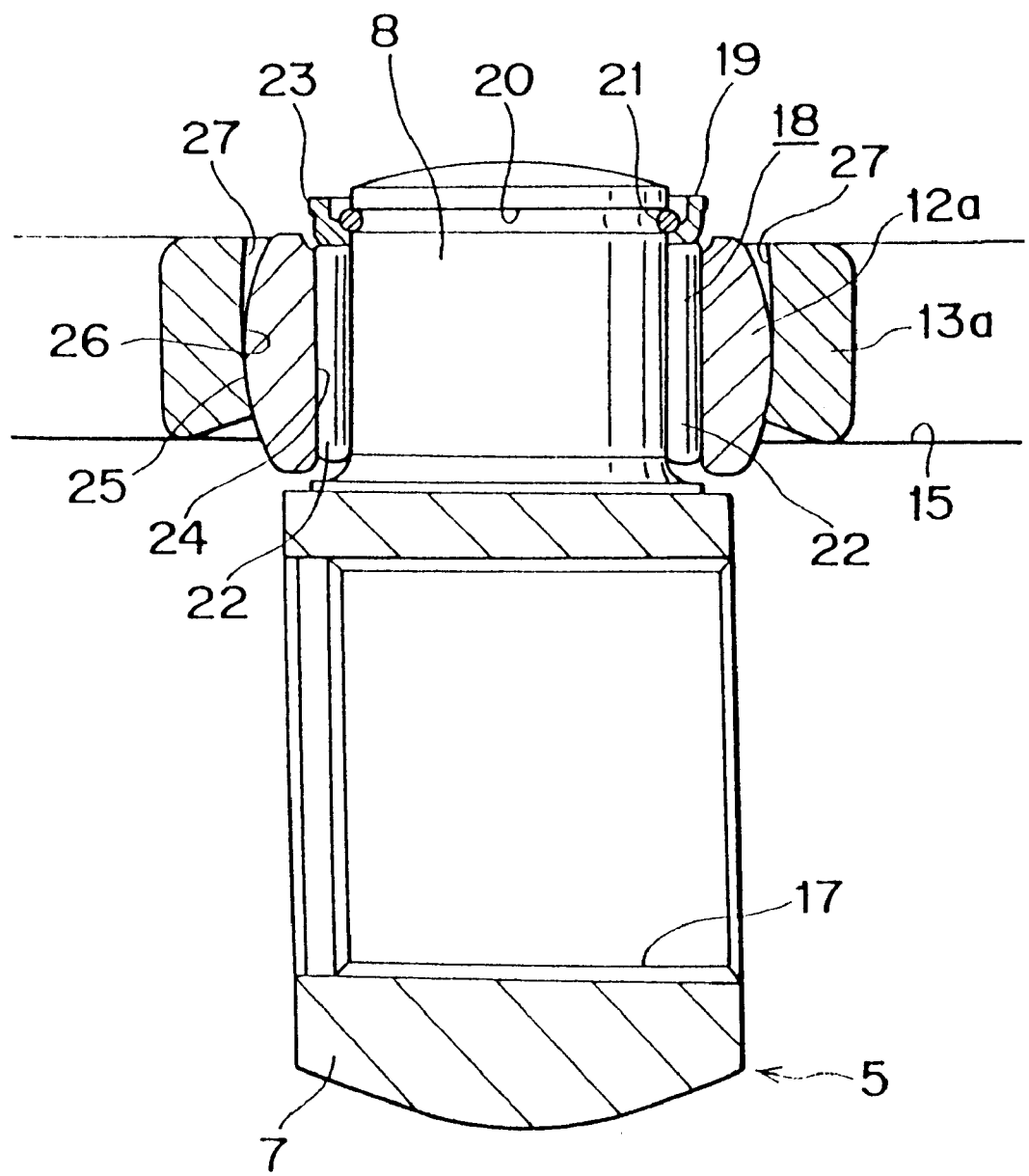
FIG. 15 is a cross sectional view taken along the line C—C of FIG. 13, with a part thereof omitted, under a zero joint angle condition.
Figure 16:
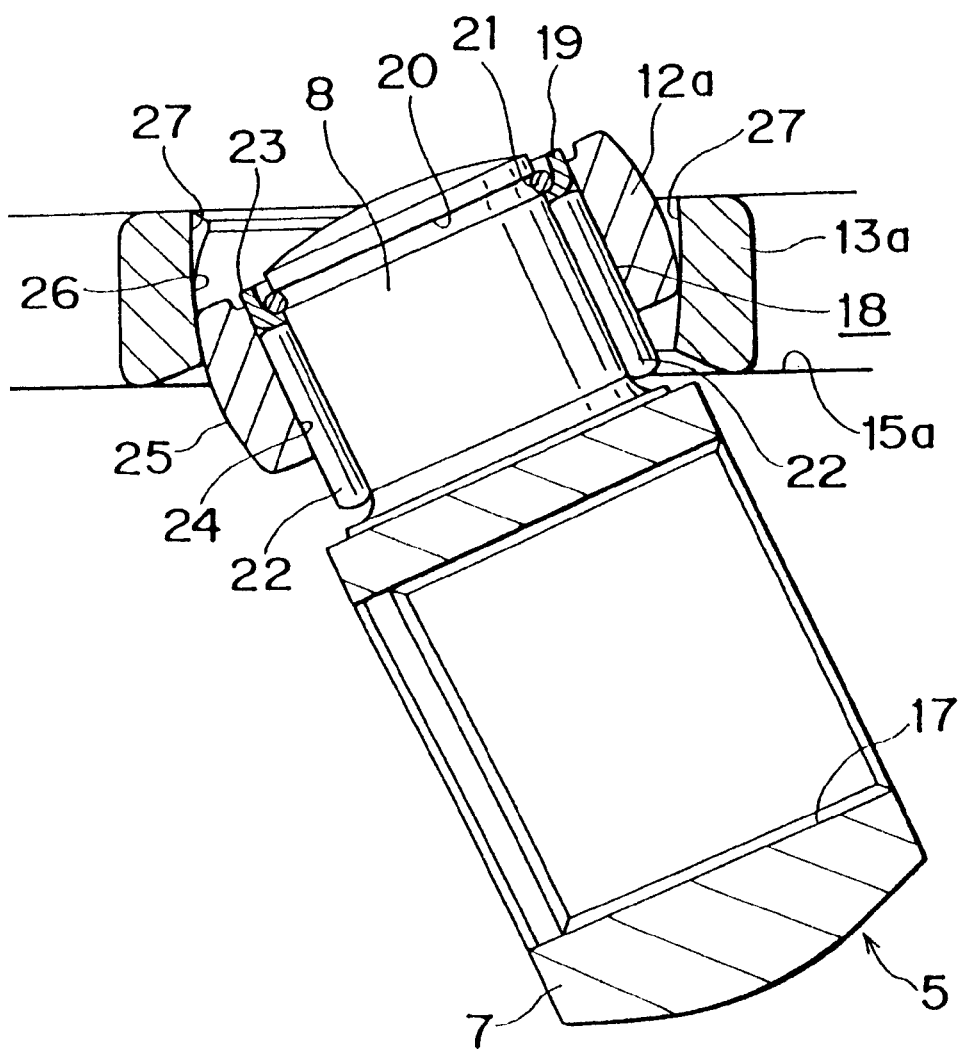
FIG. 16 is a view similar to FIG. 15, but under a large joint angle condition.
Figure 17A:
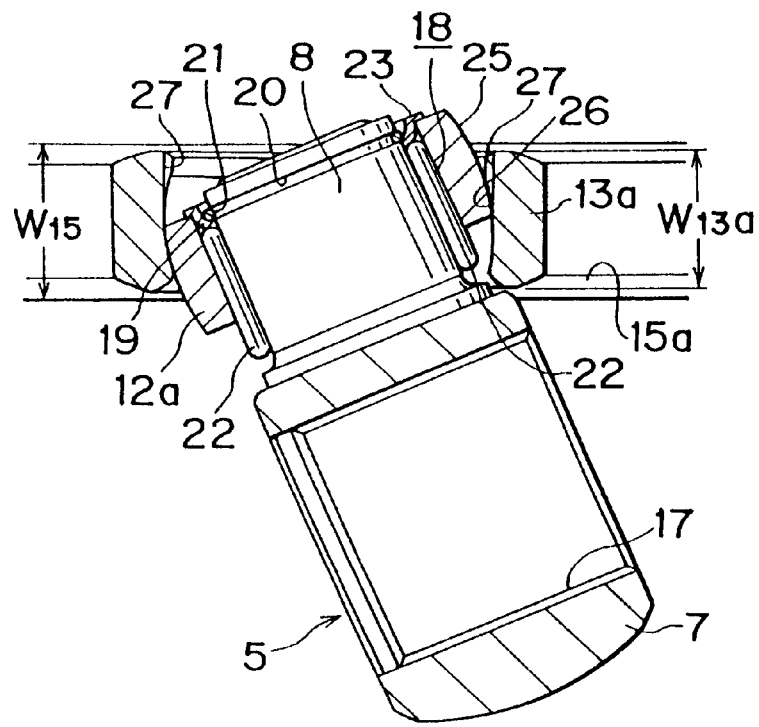
FIGS. 17A and 17B show views similar to FIGS. 15 and 16, for explaining the movements of the respective constituent parts of the joint at the time of transmission of the rotational torque under a large joint angle condition.
Figure 17B:
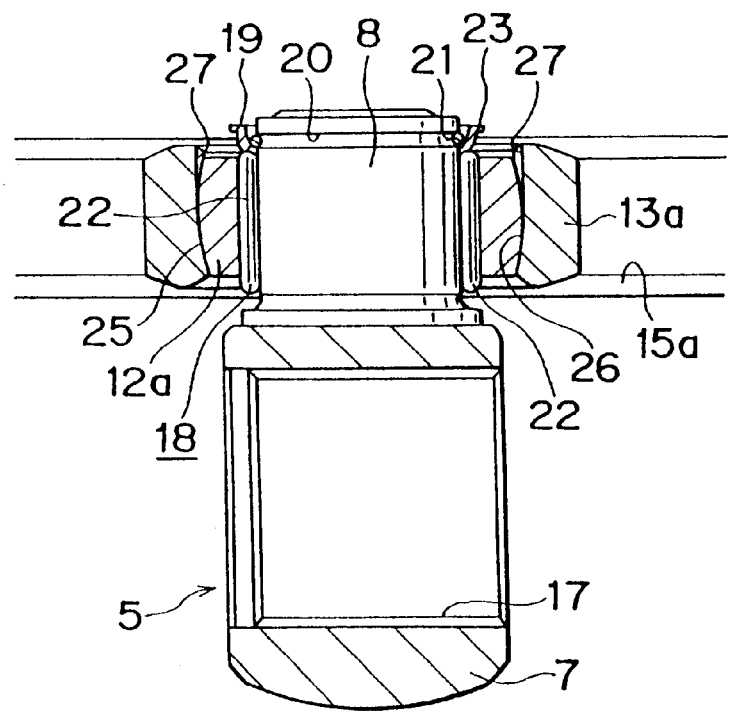
Figure 18:
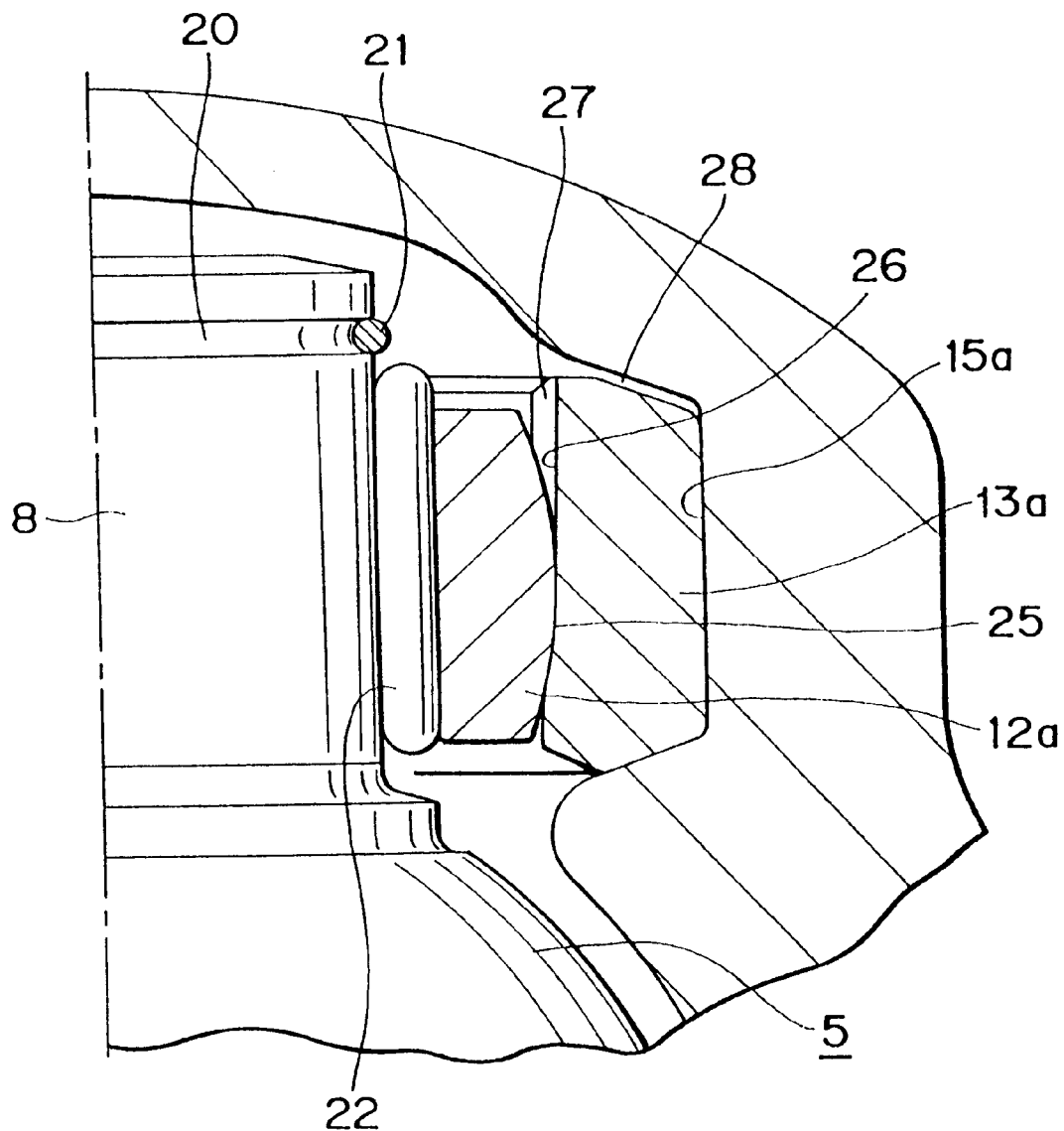
FIG. 18 is a partial cut-away front view showing a gap existing between the outer face of the outer roller and the inner face of the guide surface in an exaggerating manner.

The outer diameter D13a of each of the outer rollers 13a is slightly smaller than a spacing D29 between the guide surfaces 15a, 15a' which are formed as a pair for each of the recesses 6a (D13a<D29). Accordingly, at the time of power transmission, the inner side faces 73 of the respective rollers 13a are contacted in a sliding manner to the contacting surfaces 30A at the anchor side, but the outer side surfaces 63 are separated away from the contacting surfaces 30B at the counter anchor side. When the guide surface having a rectangular shape in cross section is used, as shown in FIG. 13, the outer side faces of the respective outer rollers 13a are not always separated from the inner side faces of the guide surfaces 15 at the counter anchor side so that the power loss inside the constant velocity joint may possibly be enhanced. In the case of the first embodiment, the inner sides of the guide surfaces 15a' at the counter anchor side are formed straight, so that a sliding contact of the inner side faces 73 of the respective outer rollers 13a at the counter anchor side can not be caused. As a result, the power loss inside the constant velocity joint can be suppressed to the minimum.

In the first embodiment, when the automobile is started backward, the housing 3a rotates the tripod 5 in the clockwise direction (the backward rotation). In such a case, the guide surfaces 15a' are brought into contact with the outer peripheral faces 43 of the respective outer rollers 13a which exist at the trailing side in the rotating direction, i.e., at the anchor side, so that the guide surfaces 15a' press the outer peripheral faces 43 of the outer rollers 13a. In the first embodiment, since each of the guide surfaces 15a and the central axis X of the corresponding trunnion 8 are disposed to be non-parallel to each other, a component force is produced in the outer roller 13a in the direction to move to the extension side (the side on which the gap between each of the guide surfaces 15a' and the central axis X of each of the trunnions 8 is extended). Then, based on this component force, each of the outer rollers 13a is moved outwardly in the axial direction of the trunnion 8 together with the corresponding inner roller 12a, so that the outer side faces 63 are pressed against the contacting portion 30B on the side of the guide surface 15a'. Thereby, the inner side faces 73 of the outer rollers 13a are not contacted to any part in the inner part in the radial direction of the constant velocity joint 1a.

For this reason, the direction in which each of the outer rollers 13a is rolled is not largely inclined relative to the length direction (the front and rear direction of FIG. 1) of the corresponding guide surface 15a', so that the rolling movement of the corresponding outer roller 13a along the guide surface 15a' can be carried out smoothly. As a result, not only losses owing to a friction produced inside the tripod type constant velocity joint can be reduced and the transmission efficiency can be enhanced, but the occurrence of the shudder can be suppressed effectively. It is noted that the axial force in such a case is substantially the same as in the case where the automobile is started forward (when the housing 3a is rotated in the counter clockwise direction). Such tripod type constant velocity joint can be used in driving the right and left wheels respectively having different rotating directions, whereby the constituent parts can be used in common.

Figure 2:
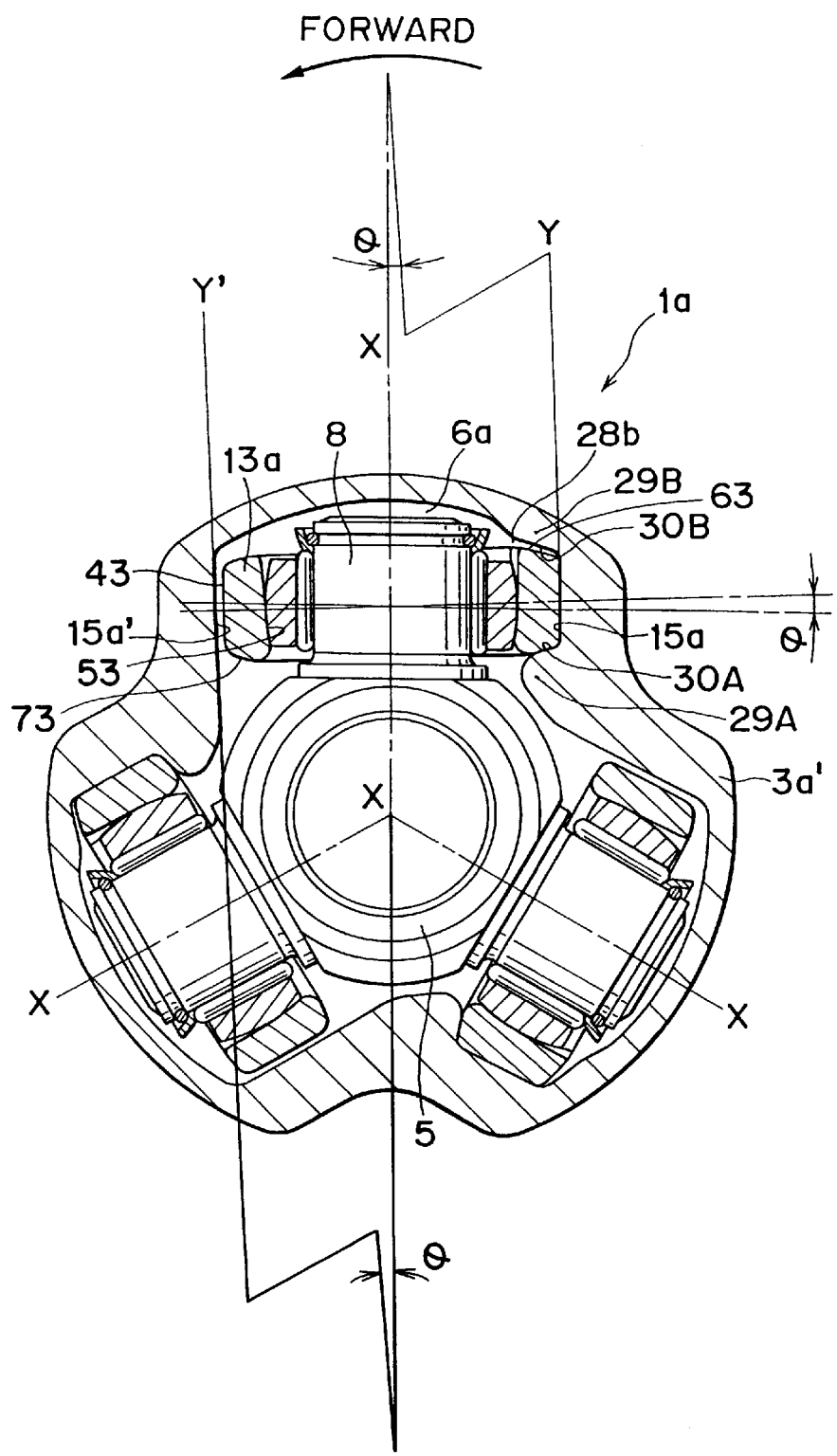
FIG. 2 is a longitudinal cross sectional view showing the second embodiment of the present invention.

FIG. 2 shows the second embodiment of the present invention, seen in the longitudinal cross section thereof. It is noted that this second embodiment will be described by focusing on different points from the first embodiment, shown in FIG. 1, and full description of the common components will be omitted.

The second embodiment is different from the first embodiment in the shape of the housing 3a' thereof. Specifically, guide portions 29A, 29B having contacting surfaces 30A, 30B which are respectively inclined inwardly and outwardly in the radial direction are formed on the guide surface 15a, and the guide surface 15a' is formed in a straight shape with no contacting surface. The guide surfaces 15a, 15a' also have asymmetrical shapes, so that it is easy to drawmaterials for forging the housing 3a'.

When the automobile incorporating the joint of the second embodiment in the drive system thereof is started forward, the housing 3a' rotates the tripod 5 in the counter clockwise direction (the forward rotation) in FIG. 2 and the guide surfaces 15a and the portions of outer peripheral faces 43 of the outer rollers 13a which exist on the trailing side in the rotating direction, i.e., the anchor side, are brought into contact to each other. Then, a component force acts upon the outer rollers 13a in a direction to move the outer rollers 13a to the extension side due to inclination of the guide surfaces 15a, so that the inner faces 73 of the respective outer rollers and the contacting surfaces 30A are brought into contact with each other in the inner part of the constant velocity joint in the radial direction. In this case, in the outer part of the constant velocity joint 1a in the radial direction, a gap 28b is always present between the outer side face 63 of each of the outer rollers 13a and each of the contacting surfaces 30B.

For this reason, a direction in which each of the outer rollers 13a is rolled is not largely inclined relative to the length direction of each of the guide surfaces 15a (the front and rear direction of FIG. 1), so that the rolling movement of the respective outer rollers 13a along the guide surfaces 15a can be carried out smoothly. As a result, losses owing to a friction which is generated inside the tripod type constant velocity joint is reduced, so that the transmission efficiency can be enhanced and, moreover, the occurrence of the shudder can be avoided effectively.

When the automobile is started backward, the housing 3a' rotates the tripod 5 in the clockwise direction (the backward rotation) in FIG. 2 and the guide surfaces 15a' and the outer peripheral faces 43 of the outer rollers 13a existing at the portions of trailing side in the rotating direction, i.e., at the anchor side, are brought into contact with each other. In such a case, a component force acts upon each of the outer rollers 13a in a direction to move to the extension side, so that the outer rollers 13a are contacted in a sliding manner to the contacting surfaces 30B at the counter anchor side due to this component force. As a result, the rotational resistance is enhanced. That is to say, in the tripod constant velocity joint of the second embodiment, the rotational resistance (the axial force) when the automobile is started forward is different from that when the automobile is started backward. However, a running direction of an automobile is mostly a forward direction, so that great inconvenience does not arise. It is noted that in the tripod constant velocity joint of the second embodiment, it is necessary to prepare two types of housings which have a mirror image relationship as the right and left wheels.

Figure 3:
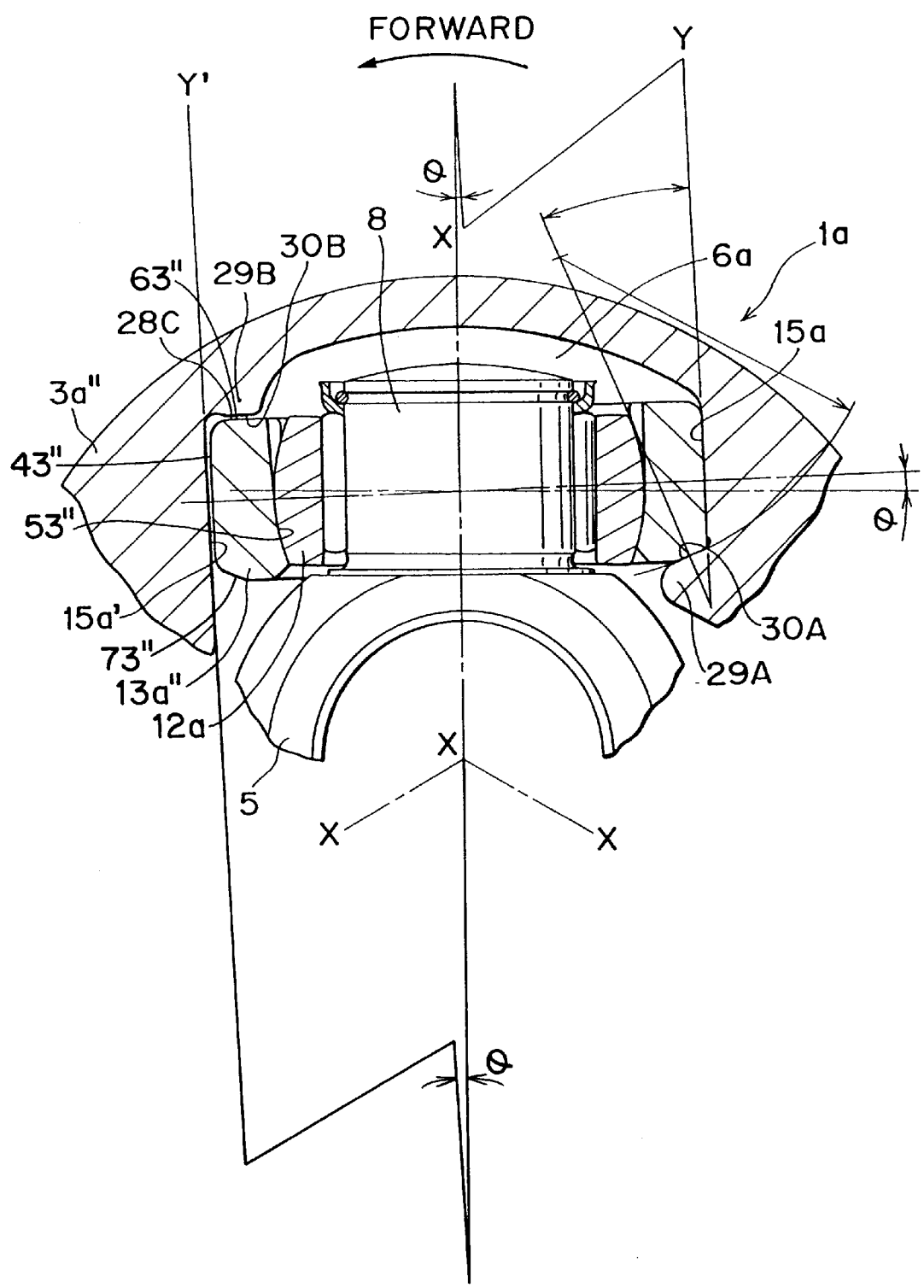
FIG. 3 is a longitudinal cross sectional view showing the third embodiment of the present invention.

FIG. 3 shows the third embodiment of the present invention, seen in a partial cross section. It is noted that the third embodiment will be described by focusing on different points from the first embodiment shown in FIG. 1, and full description will be omitted on the common components.

The third embodiment is different from the first embodiment in the shapes of the housing 3a" and the outer rollers 13a". Specifically, a guide portion 29A having a contacting surface 30A is formed on a planar guide surface 15a, while a guide portion 29B having a contacting surface 30B which is orthogonal to the planar guide surface 15a' is formed on the outer side of the guide surface 15a' in the radial direction. The inner side of each of the guide surfaces 15a' in the radial direction is extended straight. Moreover, each of the outer rollers 13a" has an inner side face 73" with a convex arcuate section corresponding to the contacting surface 30A, and the outer side face 63" of each roller 13a" corresponding to the contacting surface 30B subtending a right angle with the outer peripheral face. Also in the third embodiment, the guide surfaces 15a, 15a' have asymmetric shapes, so that it is easy to select material for forging the housing 3a".

When an automobile incorporating a joint of the third embodiment in the drive system thereof is started forward, the housing 3a" rotates the tripod 5 in the counter clockwise direction (the forward rotation) in FIG. 3 and the guide surfaces 15a and the portions of outer peripheral faces 43" of the outer rollers 13a" which exist on the trailing side in the rotating direction, i.e., the anchor side, are brought into contact with each other. Then, a component force acts upon the outer rollers 13a" in a direction in which the outer rollers 13a" are moved to the extension side due to inclination of the guide surfaces 15a, so that the inner side faces 73" of the respective outer rollers 13a" and the contacting surfaces 30A are brought into contact to each other in an inner part of the constant velocity joint in the radial direction. In this case, in an outer part of the constant velocity joint in the radial direction, a gap 28C is always present between the outer face of each of the outer rollers 13a" and the corresponding contacting surface 30B.

For this reason, a direction in which each of the outer rollers 13a" is rolled is not largely inclined relative to the length direction of each of the guide surfaces 15a (the front and rear direction of FIG. 3), so that the rolling movement of the respective outer rollers 13a" along the guide surfaces 15a can be carried out smoothly. As a result, losses owing to a friction which is generated inside the tripod type constant velocity joint is reduced, so that the transmission efficiency can be enhanced and, moreover, the occurrence of the shudder can be avoided effectively.

When the automobile is started backward, the housing 3a" rotates the tripod 5 in the clockwise direction (the backward rotation) and the guide surfaces 15a' and the outer peripheral faces 43" of the outer rollers 13a" existing at the trailing side in the portions of rotating direction, i.e., at the anchor side, are brought into contact to each other. In such a case, the guide surfaces 15a' and the portions of outer peripheral faces 43" of the outer rollers 13a existing at the trailing side in the rotating direction, i.e., at the anchor side, are brought into contact to each other, so that the guide surfaces 15a' press the outer peripheral faces 43" of the outer rollers 13a". In the third embodiment, since each of the guide surfaces 15a' and the central axis X of each of the trunnions 8 are disposed to be non-parallel to each other, a component force acts upon each of the outer rollers 13a" in a direction to move to the extension side. Then, the respective outer rollers 13a" are moved outwardly in the axial directions of the trunnions 8, together with the inner rollers 12a, so as to be pressed against the contacting portions 30B on the side of the guide surfaces 15a'. Thereby, the inner side faces 73" of the outer rollers 13a" are not contacted to any part in the inner side in the radial direction of the constant velocity joint 1a. It is noted that the guide surfaces 15a' are extended straight also in the third embodiment, so that the inner faces of the outer rollers 13a" are not contacted to any part in the inner side of the constant velocity joint 1a in the radial direction.

Figure 4:
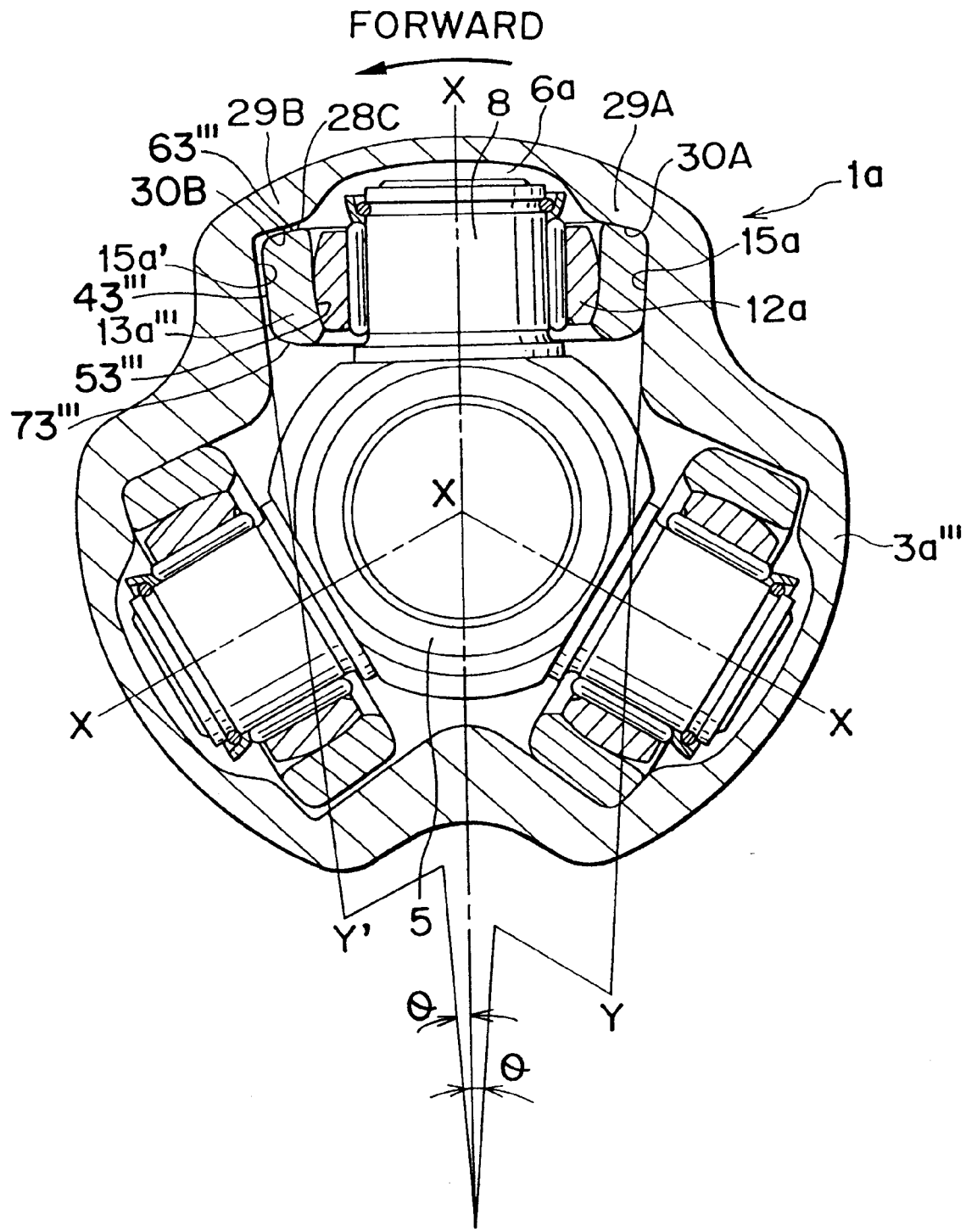
FIG. 4 is a longitudinal cross sectional view showing the fourth embodiment of the present invention.

FIG. 4 shows the fourth embodiment of the present invention, seen in a longitudinal cross section. It is noted that the fourth embodiment will be described by focusing on different points from the first embodiment shown in FIG. 1, and full description will be omitted on the common constituent parts.

The fourth embodiment is different from the first embodiment in the shapes of the housing 3a''' and the outer rollers 13a'''. Specifically, both of the guide surfaces 15a, 15a' are inclined by the angle θ, relative to the central axis X of the trunnion 8 in such a manner that they are converged in the inner part in the radial direction. Moreover, while the guide portions 29A, 29B respectively having the inclined contacting surfaces 30A, 30B at the outer sides in the radial direction are formed on the both guide surfaces 15a, 15a', the inner parts thereof in the radial direction are formed to extend straight. Moreover, each outer roller 13a''' is formed to have an outer peripheral face 43''' which is a tapered conic surface with a narrowed inner side in order to correspond to the inclination of the guide surfaces 15a, 15a'.

When an automobile incorporating a joint of the fourth embodiment in the drive system thereof is started forward, the housing 3a''' rotates the tripod 5 in the counter clockwise direction (the forward rotation) in FIG. 4 and the guide surfaces 15a and the portions of outer peripheral faces 43''' of the outer rollers 13a''' which exist on the trailing side in the rotating direction, i.e., the anchor side, are brought into contact with each other. Then, a component force acts upon the outer rollers 13a''' in a direction to move to the extension side due to inclination of the guide surfaces 15a, so that the outer side faces 63''' of the outer rollers 13a''' and the respective contacting surfaces 30A are brought into contact to each other in an inner part of the constant velocity joint 1a in the radial direction. In this case, since the guide surfaces 15a, 15a' are formed to extend straight, the inner side faces 73''' of the outer rollers 13a''' are not contacted to any inner part of the constant velocity joint 1a in the radial direction.

Accordingly, a direction in which each of the outer rollers 13a''' is rolled is not largely inclined relative to the length direction of each of the guide surfaces 15a (the front and rear direction of FIG. 4), so that the rolling movement of the respective outer rollers 13a''' along the guide surfaces 15a can be carried out smoothly. As a result, losses owing to a friction which is generated inside the tripod type constant velocity joint is reduced, so that the transmission efficiency can be enhanced and, moreover, the occurrence of the shudder can be avoided effectively.

When the automobile is started backward, the housing 3a''' rotates the tripod 5 in the clockwise direction (the reverse rotation) in FIG. 4 so that the guide surfaces 15a' and the portions of outer peripheral faces 43''' of the outer rollers 13a''' existing at the trailing side in the rotating direction, i.e., at the anchor side, are brought into contact to each other. In such a case, the guide surfaces 15a' existing on the rear side in the rotating direction, i.e., the anchor side, and the outer peripheral faces 43''' of the respective outer rollers 13a''' are brought into contact to each other so that the guide surfaces 15a' press the outer peripheral faces 43''' of the outer rollers 13a'''. Whereupon, in the same manner as in the case of the forward rotation, a component force in the direction to move the outer rollers 13a''' to the extension side acts upon the outer rollers 13a''', and then the outer side faces 63''' of the outer rollers 13a''' and the respective contacting surfaces 30B are brought into contact in outer side portions of the constant velocity joint 1a in the radial direction. In this case, since the guide surfaces 15a, 15a' are formed to extend straight, the inner side faces 73''' of the outer rollers 13a''' are not contacted to any inner part of the constant velocity joint 1a in the radial direction.

Next, setting of the angle of inclination θ of the guide surfaces 15a and 15a' with respect to the central axis X will be described specifically.

Figure 5:
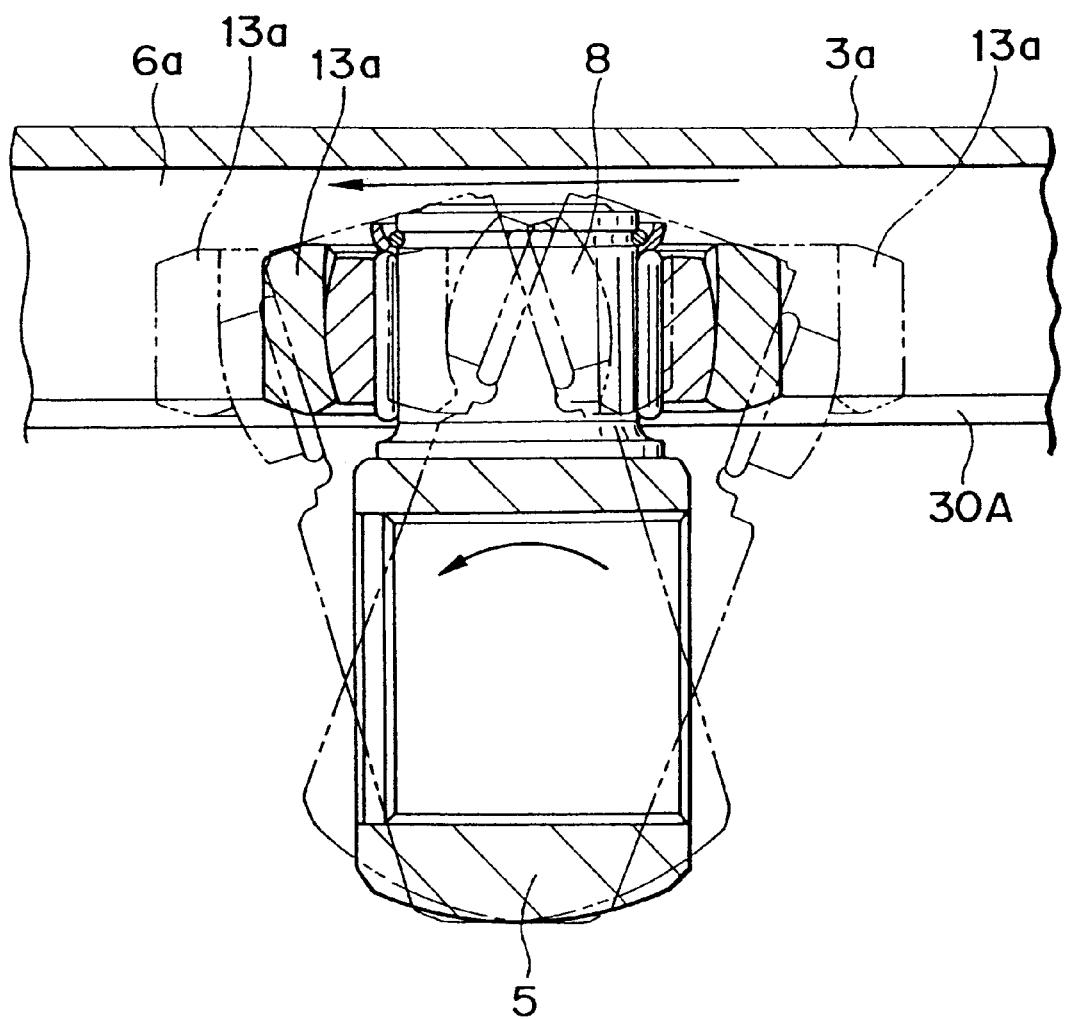
FIG. 5 is an explanatory view (lateral cross sectional view) showing a movement of a trunnion.

When the rotational torque is transmitted between the housing 3a and the tripod 5 with a joint angle, the trunnion 8 swings back and forth relative to the recess 6a of the housing 3a, as shown in the view seen from the longitudinal cross section in FIG. 5, and the outer roller 13a supported by the trunnion 8 rolls back and forth along the guide surfaces 15a, 15a'. In this case, a force for changing inwardly the direction of the rolling movement of the outer roller 13a acts upon the outer roller 13a and is produced due to a frictional resistance (spin resistance) in the spherical engagement portion with the inner roller 12a. It is noted that the outer roller 13a is rolled in a direction orthogonal to the contact generatrix with the guide surfaces 15a, 15a' unless an external force acts upon it.

On the other hand, the direction of a relative displacement of the trunnion 8 to the outer roller 13a is changed from the outward direction of the housing 3a into the axial direction thereof at the central position of a stroke of the back and forth rolling movement (that is, the back and forth swing of the trunnion 8) of the outer roller 13a. For this reason, a frictional resistance following the relative displacement of the trunnion 8 acts as a force to move the outer roller 13a outward in the first half of the stroke (the right half in FIG. 5) through the inner roller 13a and as a force to move the outer roller 13a inward in the second half of the stroke (the left half in FIG. 5).

Accordingly, at the time of the forward rotation in the first to third embodiments, in addition to the component of the pressing force (inward force) of the anchor portion due to the inclination of the guide surface 15a and the spin resistance (inward force), a force to move the outer roller 13a outward in the first half of the stroke acts upon the outer roller 13a and a force to move the outer roller 13a inward in the second half of the stroke. For this reason, if a sum of the component of the pressing force of the anchor portion and the spin resistance is larger than the force to move the outer roller 13a outward in the first half of the stroke, the outer roller 13a is not separated from the contacting surface 30A in the first half of the stroke.

However, at the time of the backward rotation in the first to third embodiments and at the time of the forward and backward rotations in the fourth embodiment, the component of the pressing force of the anchor portion due to the inclination of the guide surface 15$a$' (the guide surfaces 15$a$, 15$a$' in the fourth embodiment) becomes an outward force, so that the force to move the outer roller 13$a$ outward (the outward force) in the first half of the stroke, in addition to the component of the pressing force of the anchor portion (outward force) and the spin resistance (inward force), acts upon the outer roller 13$a$, and the force to move the outer roller 13$a$ inward (the inward force) acts in the second half of the stroke. Accordingly, if the component of the pressing force of the anchor portion is smaller than a sum of the spin resistance and the force to move the outer roller 13$a$ inward, the outer roller 13$a$ is separated from the contacting surface 30B in the second half of the stroke.

That is to say, when the angle of inclination θ of the guide surface 15$a$' is small, it is a concern that the outer roller 13$a$ may be contacted with the contacting surface 30A in the first to third embodiments, while it is a concern that the outer roller 13$a$ may be contacted with the guide surface 15$a$ in the fourth embodiment. These contacts act as extremely large frictional resistances against the outer roller 13, so as to possibly cause a shudder owing to an increase of the axial force. As a result, it is required to set the angle of inclination θ of the guide surface 15$a$' to be sufficiently large so that the component force is larger than the sum of the pressing force of the anchor portion and the spin resistance.

Figure 6:
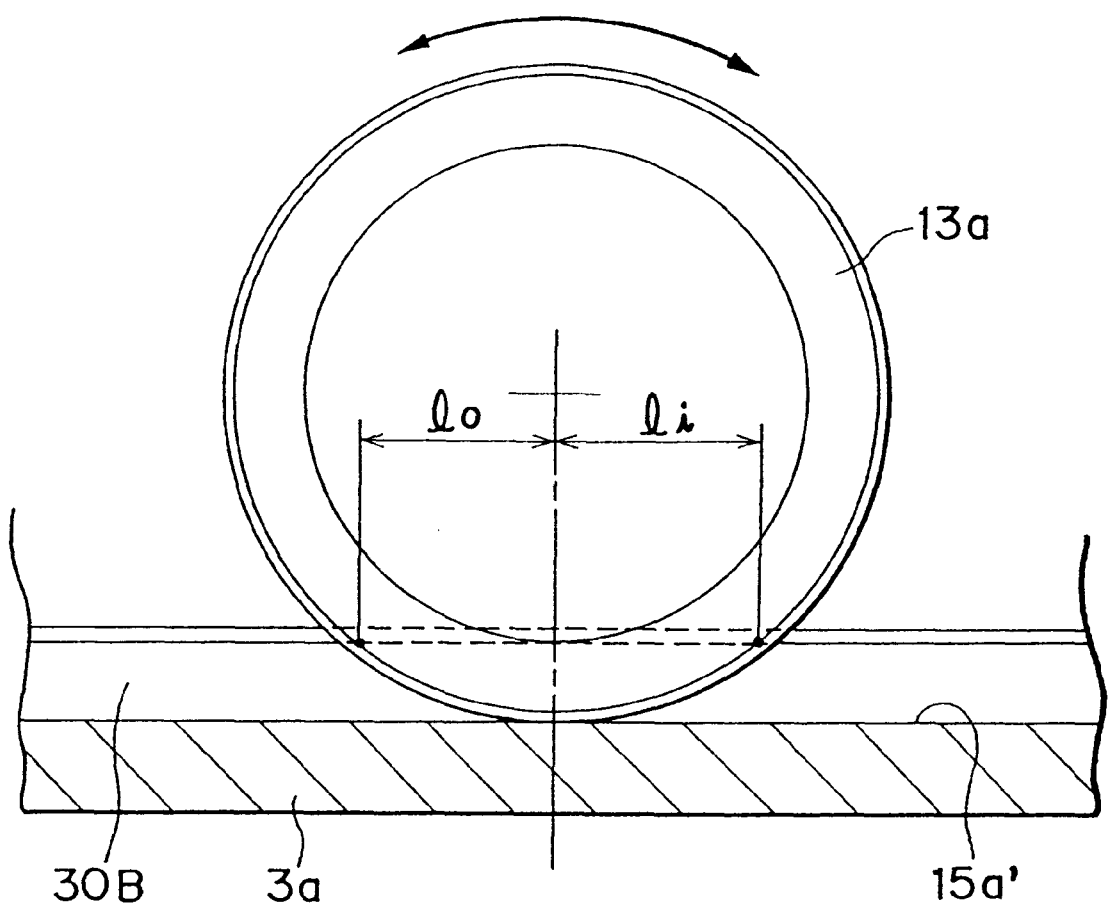
FIG. 6 is an explanatory view showing a state of contact between a contacting surface and an outer roller.
Figure 19:
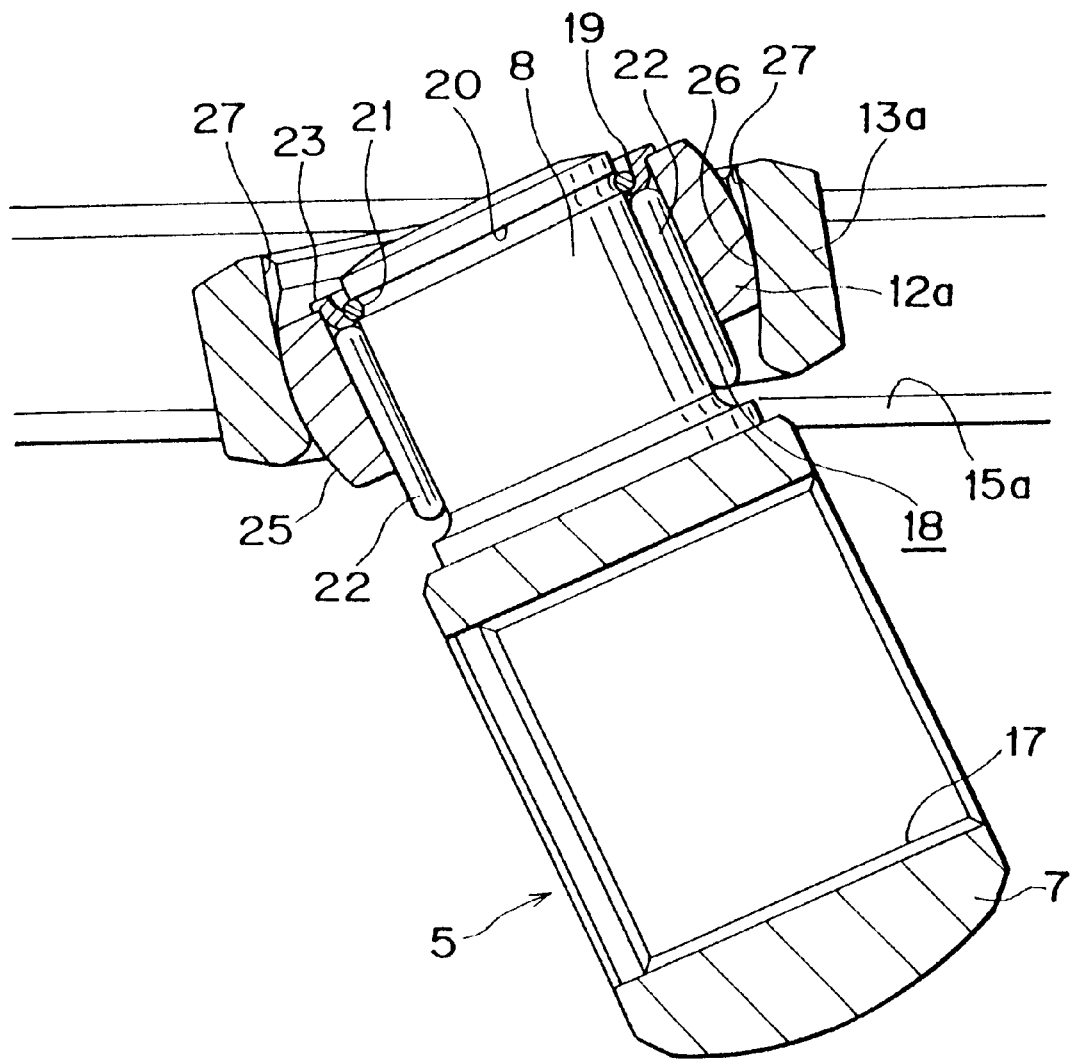
FIG. 19 is a view similar to FIG. 16, for showing a state in an exaggerating manner where the outer roller is inclined owing to the gap existing between the outer face of the outer roller and the inner face of the guide surface.

When the angle of inclination θ is too small, the component of the pressing force of the anchor portion becomes too small so that the outer roller 13$a$ is separated from the contacting surface 30B and the outer roller 13$a$ is inclined to increase the axial force, as shown in FIG. 19. On the other hand, when the angle of inclination θ is too large, the component of the pressing force of the anchor portion becomes larger than necessary so that a contact pressure between the outer face of the outer roller 13$a$ and the contacting surface 30A is increased at the forward rotation. As a result, a rolling movement of the outer roller 13$a$ is not carried out smoothly and the axial force is enhanced. It is noted that a spin moment acting upon the outer roller 13$a$ is supported by the contact between the outer face of the outer roller 13$a$ and the contacting surface 30B, as shown in FIG. 6. Consequently, the longer the distance li or lo (the length of the arm) between the center of the contact (the axial center of the outer roller 13$a$) to the contacting end is, the smaller a contacting load to act upon the contacting end can be. To this end, the position of contact between the outer roller 13$a$ and the contacting surface 30B (the height h from the guide surface 15$a$') is desired to be large.

Figure 7:
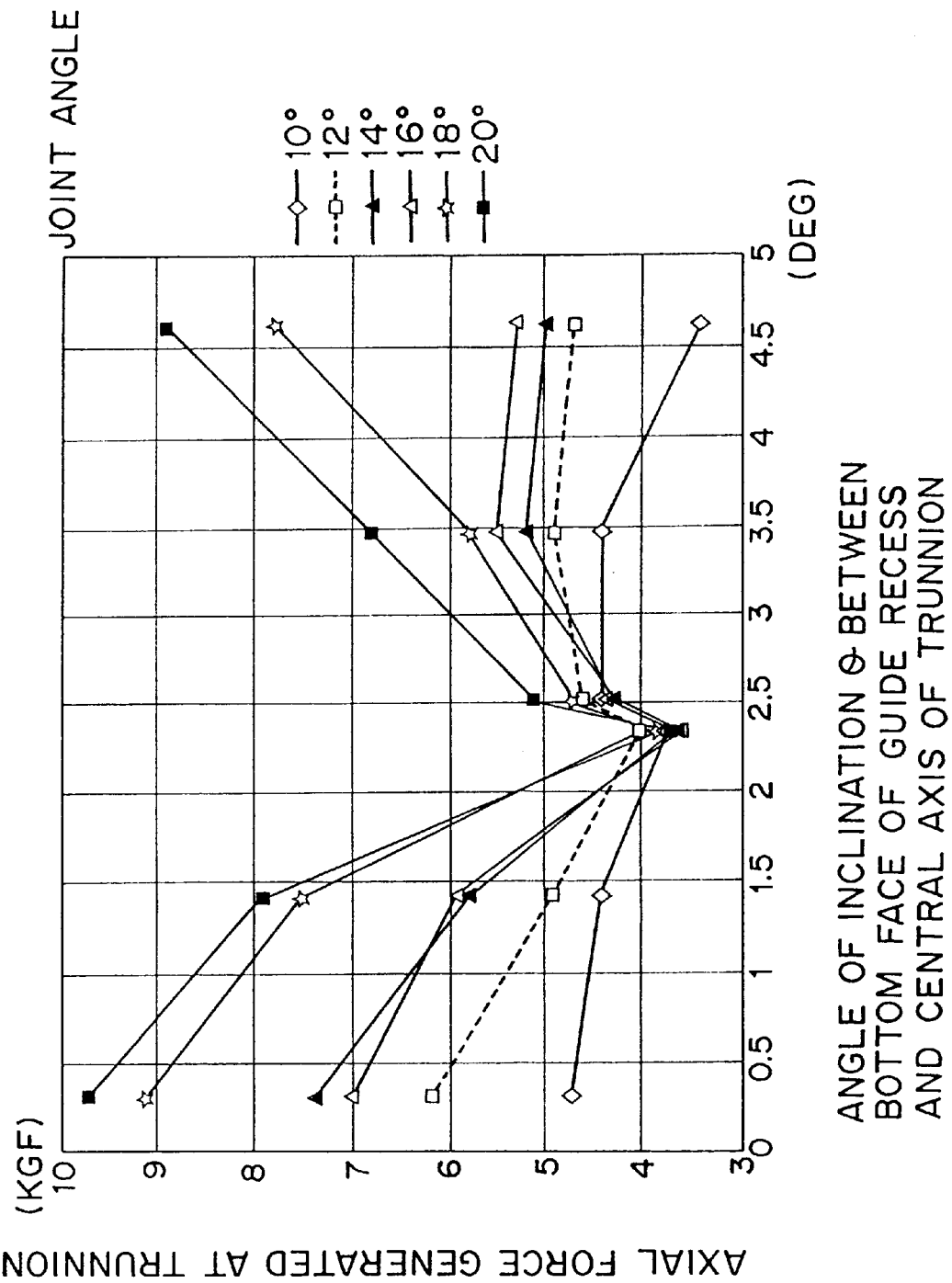
FIG. 7 is a graph showing an angle of inclination between the bottom surface of a guide surface and the central shaft of a trunnion and an influence of a joint angle upon the axial force of the trunnion.
Figure 8:
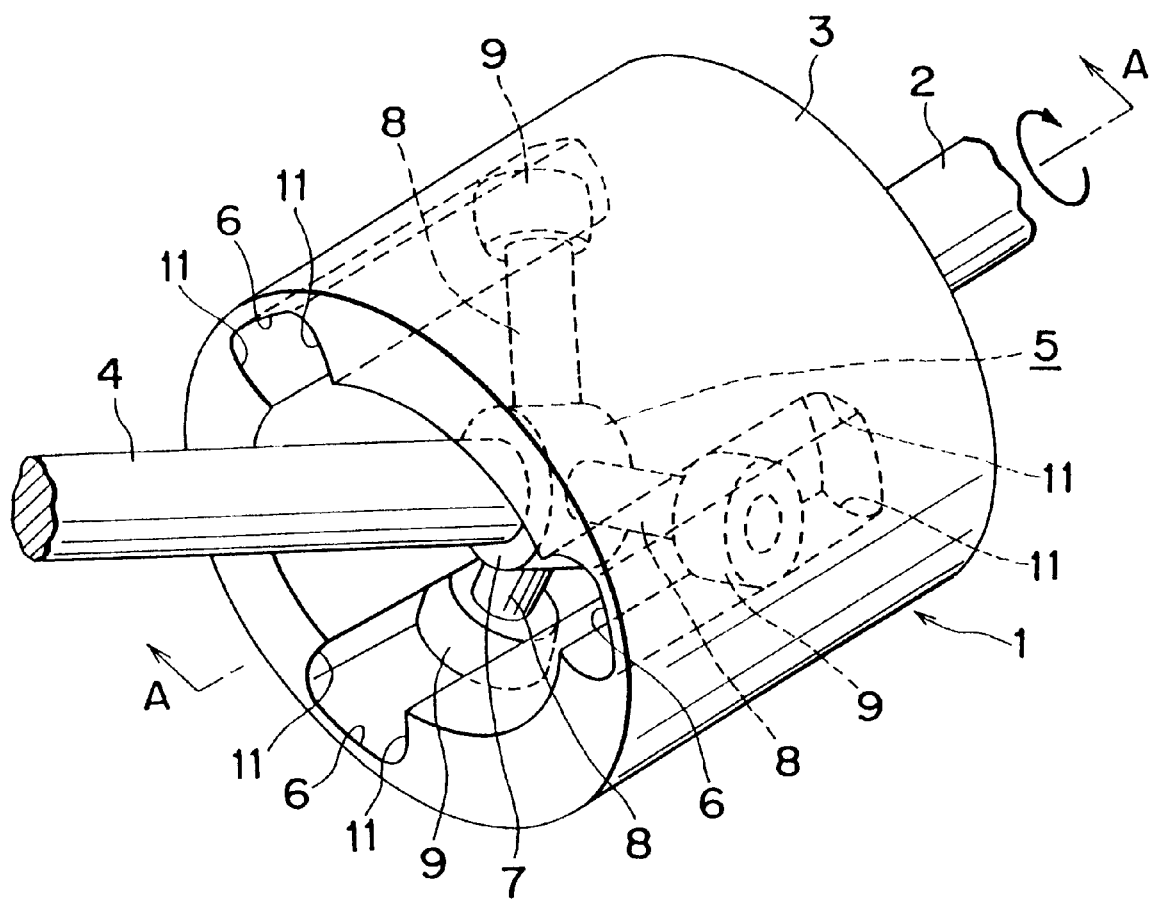
FIG. 8 is a schematic perspective view showing the first example of a conventional tripod type constant velocity joint.
Figure 9:
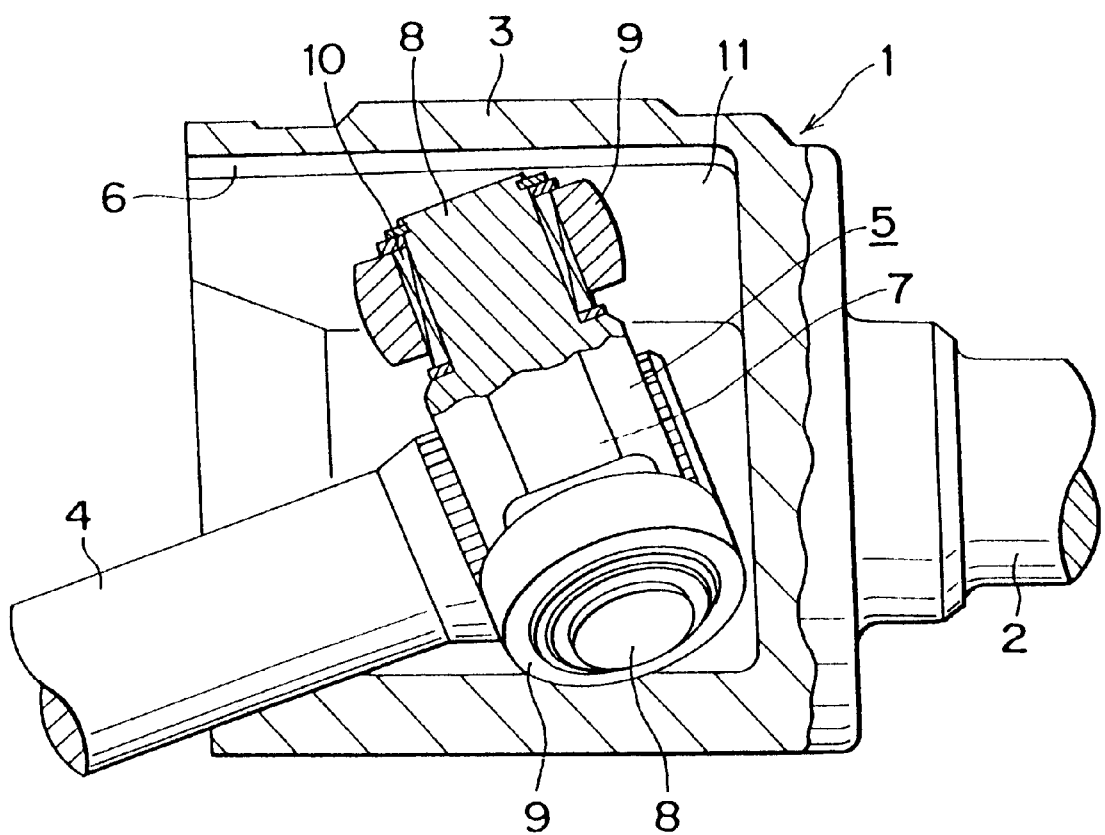
FIG. 9 is a cross sectional view taken along the line A—A of FIG. 8.
Figure 10:
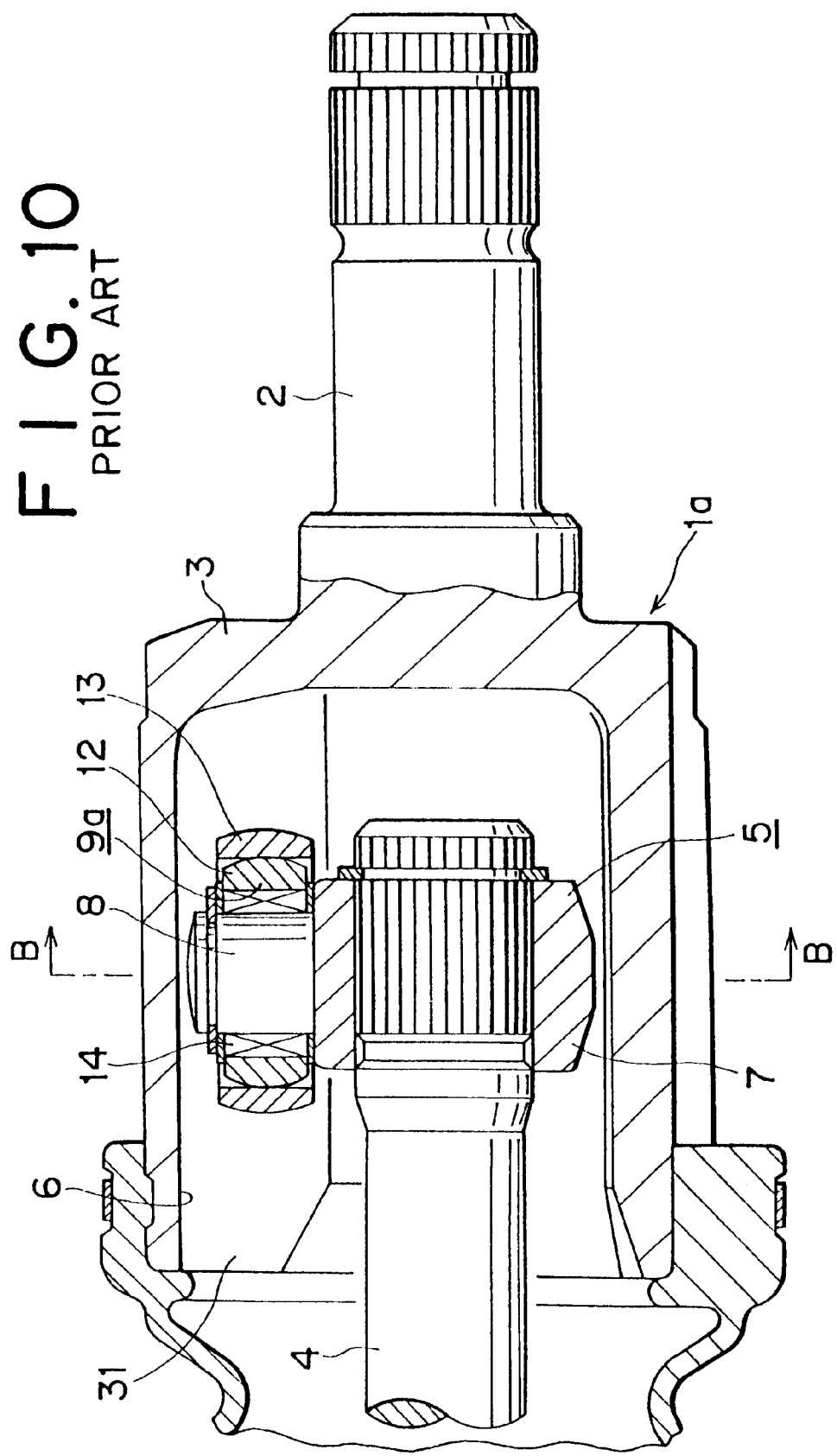
FIG. 10 is a partial cut-away side view showing the second example of a conventional tripod type constant velocity joint under a zero joint angle condition.
Figure 11:
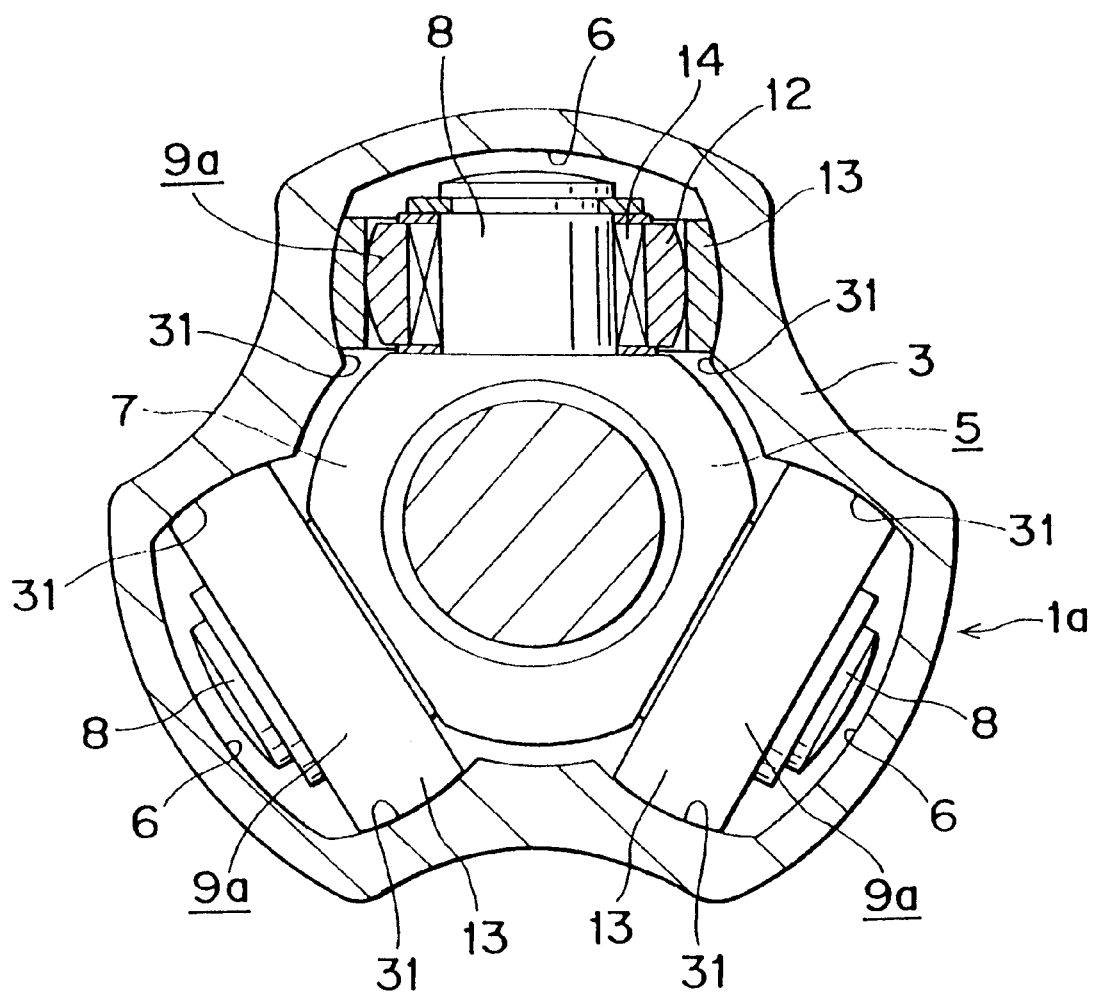
FIG. 11 is a cross sectional view taken along the line B—B of FIG. 10.
Figure 12:
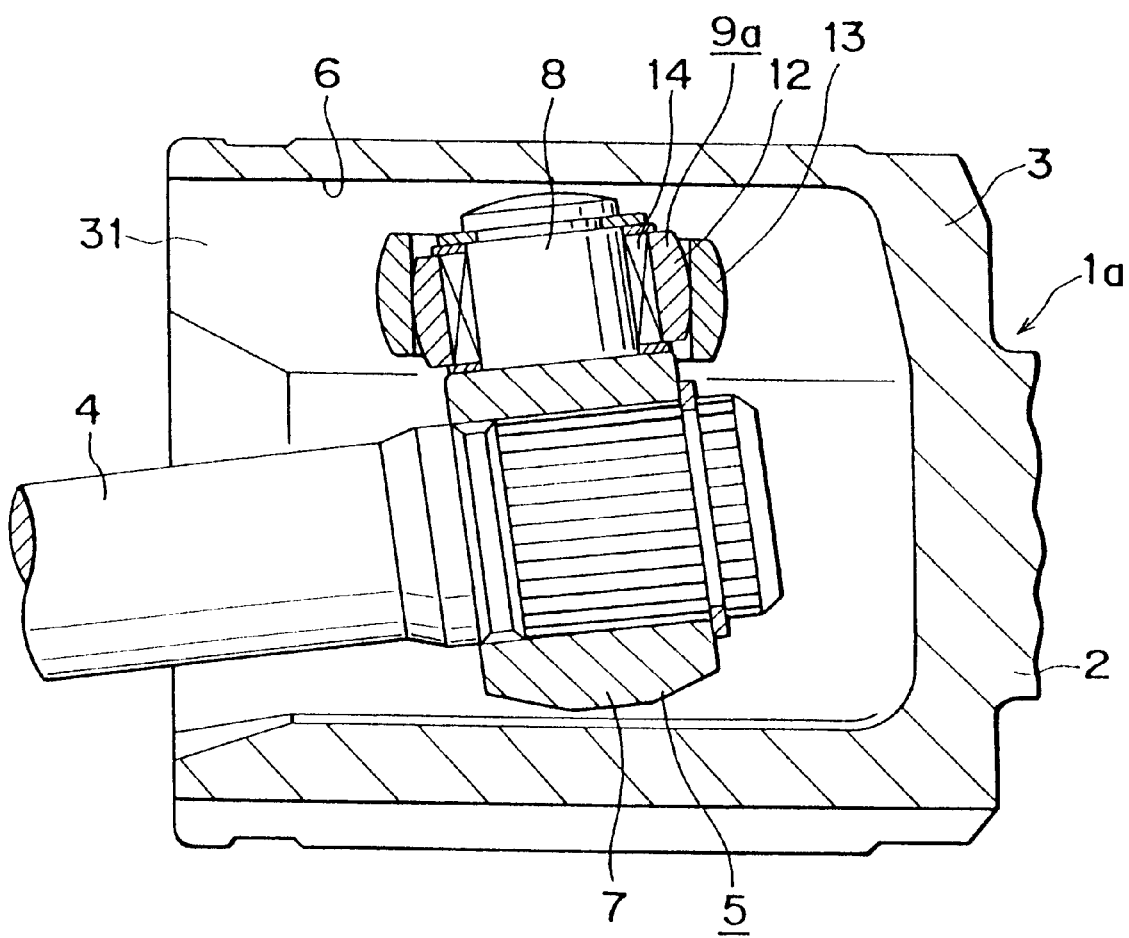
FIG. 12 is a view corresponding to the left part of FIG. 10 under a joint angle condition.

According to experiments conducted by the present inventors, it has been found that, if the angle of inclination θ is set in a range from 1.5 to 3.5 degrees, preferably in a range from 2 to 3 degrees, the axial force acting upon the trunnion 8 can be sufficiently reduced. The results of the experiment are shown in the graph in FIG. 7. Referring to FIG. 7, the abscissa represents the angle of inclination θ, while the ordinate represents a value of the axial force generated in the tripod 5, respectively. Such experiments were carried out by changing an intersection angle (the joint angle) between the central axis of the housing 3$a$ and the central axis of the tripod 5 in six sets by two degrees over a range from 10 to 20 degrees. It is noted the joint angles for curves are shown on the right of FIG. 7.

As described above, the tripod type constant velocity joint of the present invention comprises a housing formed in a hollow cylindrical shape opened at one end thereof in the axial direction and secured to an end of a first rotating shaft, three recesses formed at equal spacing on the inner face of this housing in the circumferential direction, a pair of guide surfaces formed at positions opposite to each other in each of the recesses to extend along the axial direction of the housing, a tripod secured to an end of a second rotating shaft and having three trunnions protruding from the outer peripheral face thereof at equal spacing in the circumferential direction to be inserted into the respective recesses, three inner rollers fitted on the trunnions to be freely rotated, and three outer rollers fitted on these inner rollers to freely swing and having the outer peripheral faces respectively serving as rolling contact surfaces placed in rolling contact relationship with the guide surfaces, wherein each of these outer rollers is moved along the axial direction of the corresponding trunnion so that a rotational torque can be transmitted at constant velocity between the both rotating shafts even with a joint angle provided between the first and second rotating shafts. In such constant velocity joint, out of the pair of guide surfaces, the guide surface on the anchor side to tightly press the outer peripheral face of the outer roller when the rotational torque is transmitted in a predetermined direction is made non-parallel to the central axis of the trunnions under a zero joint angle condition and there are provided guide portions each having a contact surface to contact with a side face of the outer roller at the anchor side on the side on which a distance between the guide surface on the anchor side and the central axis of the trunnion is extended, so that, at the time of transmission of the rotational torque, a component force of the rotational torque acts upon the outer roller in a direction in which the distance between the guide surface on the anchor side and the central axis of the trunnion is extended, whereby the side face of the outer roller is pressed against the contacting surface of the guide portion and is difficult to be inclined relative to the guide surface on the anchor side so as to be difficult tobe inclined relative to the anchor-side guide surface and to be easily rolled and moved along the guide surface on the anchor side smoothly. As a result, frictional losses inside the tripod type constant velocity joint are reduced to enhance the transmission efficiency of the rotational torque, and the axial force acting upon the tripod is also reduced so as to make it difficult to generate shudder.

What is claimed is:

1. A tripod type constant velocity joint comprising:

a housing formed in a hollow, generally cylindrical shape open at one end thereof in an axial direction and secured to an end of a first rotating shaft;

three recesses formed at equal spacing on an inner face of said housing in a circumferential direction;

a pair of substantially planar guide surfaces formed at positions opposite to each other in each of the recesses to extend along the axial direction of said housing;

a tripod secured to an end of a second rotating shaft and having three trunnions protruding from an outer peripheral face thereof at equal spacing in the circumferential direction and received in said respective recesses;

three inner rollers fitted on said trunnions respectively to be freely rotated; and three outer rollers fitted on said inner rollers respectively to freely swing, each of said outer rollers having an outer end face and an inner end face, and further having an outer peripheral face serving as a rolling contact surface placed in rolling contact relationship with said guide surfaces of the corresponding recess, each outer roller being movable along an axial direction of the corresponding trunnion so that a rotational torque can be transmitted at constant velocity between said rotating shafts even with a non-zero joint angle provided between said rotating shafts, said tripod type constant velocity joint being characterized in that:

one guide surface of each said pair of guide surfaces defines an anchor side to tightly press the outer peripheral face of the corresponding outer roller when the rotational torque is transmitted in a predetermined direction, said one guide surface being non-parallel to a central axis of the corresponding trunnion under a zero joint angle condition; and there are provided with each said pair of guide surfaces at least one guide portion having a contact surface to contact with one of said outer and inner end faces of the corresponding outer roller, a distance between said guide surface on the anchor side and the central axis of the corresponding trunnion being longer near said one end face than near the other end face.

2. A tripod type constant velocity joint according to claim 1, wherein respective extension lines of each pair of guide surfaces intersect an extension line of the central axis of the corresponding trunnion on a same side of said housing.

3. A tripod type constant velocity joint according to claim 1, wherein respective extension lines of each pair of guide surfaces intersect an extension line of the central axis of the corresponding trunnion on opposite sides of said housing.

4. A tripod type constant velocity joint according to claim 1, wherein an angle formed between said contacting surface of said guide portion and said guide surface on the anchor side is an obtuse angle.

5. A tripod type constant velocity joint according to claim 1, wherein an angle formed between said contacting surface of said guide portion and said guide surface on the anchor side is a right angle.

6. A tripod type constant velocity joint according to claim 1, wherein the outer peripheral face of each outer roller is formed as a conical surface and the corresponding pair of guide surfaces are inclined and disposed so as not to be brought into contact with said conical surface at the same time.

7. A tripod type constant velocity joint according to claim 1, wherein said guide surfaces of each pair are parallel to each other.

8. A tripod type constant velocity joint according to claim 7, wherein respective extension lines of each pair of guide surfaces intersect an extension line of the central axis of the corresponding trunnion at an angle from about 1.5 and to 3.5 degrees.

9. A tripod constant velocity joint according to claim 8, wherein said angle is from about 2.0 to about 3.0 degrees.

10. A tripod type constant velocity joint according to claim 1, wherein said guide surfaces of each pair converge toward a central axis of said housing.

11. A tripod type constant velocity joint according to claim 10, wherein respective extension lines of each pair of guide surfaces intersect an extension line of the central axis of the corresponding trunnion at an angle from about 1.5 and about 3.5 degrees.

12. A tripod type constant velocity joint according to claim 11, wherein wherein said angle is from about 2.0 to about 3.0 degrees.

13. A tripod type constant velocity joint comprising:

a housing formed in a hollow, generally cylindrical shape open at one end thereof in an axial direction and secured to an end of a first rotating shaft;

three recesses formed at equal spacing on an inner face of said housing in a circumferential direction;

a pair of substantially planar guide surfaces formed at positions opposite to each other in each of the recesses to extend along the axial direction of said housing;

a tripod secured to an end of a second rotating shaft and having three trunnions protruding from an outer peripheral face thereof at equal spacing in the circumferential direction and received in said respective recesses;

three inner rollers fitted on said trunnions respectively to be freely rotated; and three outer rollers fitted on said inner rollers respectively to freely swing, each of said outer rollers having an outer end face and an inner end face, and further having an outer peripheral face serving as a rolling contact surface placed in rolling contact relationship with said guide surfaces of the corresponding recess, each outer roller being movable along an axial direction of the corresponding trunnion so that a rotational torque can be transmitted at constant velocity between said rotating shafts even with a non-zero joint angle provided between said rotating shafts, said tripod type constant velocity joint being characterized in that:

one guide surface of each said pair of guide surfaces defines an anchor side to tightly press the outer peripheral face of the corresponding outer roller when the rotational torque is transmitted in a predetermined direction, said one guide surface being non-parallel to a central axis of the corresponding trunnion under a zero joint angle condition.

14. A tripod type constant velocity joint according to claim 13, wherein respective extension lines of each pair of guide surfaces intersect an extension line of the central axis of the corresponding trunnion on a same side of said housing.

15. A tripod type constant velocity joint according to claim 13, wherein respective extension lines of each pair of guide surfaces intersect an extension line of the central axis of the corresponding trunnion on opposite sides of said housing.

16. A tripod type constant velocity joint according to claim 13, wherein the outer peripheral face of each outer roller is formed as a conical surface and the corresponding pair of guide surfaces are inclined and disposed so as not to be brought into contact with said conical surface at the same time.

17. A tripod type constant velocity joint according to claim 13, wherein said guide surfaces of each pair are parallel to each other.

18. A tripod type constant velocity joint according to claim 17, wherein respective extension lines of each pair of guide surfaces intersect an extension line of the central axis of the corresponding trunnion at an angle from about 1.5 and about 3.5 degrees.

19. A tripod type constant velocity joint according to claim 18, wherein said angle is from about 2.0 to about 3.0 degrees.

20. A tripod type constant velocity joint according to claim 13, wherein said guide surfaces of each pair converge toward a central axis of said housing.

21. A tripod type constant velocity joint according to claim 20, wherein respective extension lines of each pair of guide surfaces intersect an extension line of the central axis of the corresponding trunnion at an angle from about 1.5 and about 3.5 degrees.

22. A tripod type constant velocity joint according to claim 21, wherein said angle is from about 2.0 to about 3.0 degrees.

* * * * *